US012592154B2

(12) United States Patent
Inoue

(10) Patent No.:    US 12,592,154 B2
(45) Date of Patent:    Mar. 31, 2026

(54) CONTROL DEVICE, MONITORING SYSTEM, CONTROL METHOD, AND NON-TRANSITORY COMPUTER-READABLE RECORDING MEDIUM

(71) Applicant: NEC Corporation, Tokyo (JP)

(72) Inventor: Akira Inoue, Tokyo (JP)

(73) Assignee: NEC CORPORATION, Tokyo (JP)

( * ) Notice:    Subject to any disclaimer, the term of this patent is extended or adjusted under 35 U.S.C. 154(b) by 655 days.

(21) Appl. No.:    17/908,363

(22) PCT Filed:    Mar. 4, 2020

(86) PCT No.:    PCT/JP2020/009095
§ 371 (c)(1),
(2) Date:    Aug. 31, 2022

(87) PCT Pub. No.:    WO2021/176585
PCT Pub. Date: Sep. 10, 2021

(65)    Prior Publication Data
US 2023/0086998 A1    Mar. 23, 2023

(51) Int. Cl.
*G08G 5/55*    (2025.01)
*B64C 39/02*    (2023.01)
(Continued)

(52) U.S. Cl.
CPC ............. *G08G 5/55* (2025.01); *B64C 39/024* (2013.01); *G06V 10/40* (2022.01); *G08G 5/26* (2025.01);
(Continued)

(58) Field of Classification Search
CPC ... G08G 5/55; G08G 5/26; G08G 5/57; B64C 39/024; G06V 10/40; G06V 10/757;
(Continued)

(56)    References Cited

U.S. PATENT DOCUMENTS

2016/0266579 A1    9/2016    Chen et al.
2017/0092109 A1    3/2017    Trundle et al.
(Continued)

FOREIGN PATENT DOCUMENTS

JP    H04-090009 A    3/1992
JP    2000-047728 A    2/2000
(Continued)

OTHER PUBLICATIONS

Seth Holsinger and Rajnikant Sharma, Multiple Target Tracking Via Dynamic Point Clustering on a UAV Platform, 2019, AIAA Scitech Forum, pp. 1-5 (Year: 2019).*
(Continued)

*Primary Examiner* — Ig T An
*Assistant Examiner* — Chase L Cooley
(74) *Attorney, Agent, or Firm* — Sughrue Mion, PLLC

(57)    ABSTRACT

A control device according to an aspect of the present disclosure includes: an acquiring means for acquiring position information, battery information, and movement capability information regarding each of mobile objects; a predicting means predict a monitorable time based on the position information of a monitoring mobile object, the position information of a standby mobile object, and the battery information and the movement capability information of each of the mobile objects, the monitoring mobile object monitoring a target, the standby mobile object being on standby, the monitorable time being a time for which the target is monitorable by each standby mobile object; a selecting means for selecting, based on the monitoring availability time, at least one mobile object among the standby mobile objects; and a controlling means for controlling the selected mobile object to move to a position from which to monitor the target.

15 Claims, 17 Drawing Sheets

(51) Int. Cl.

| | |
|---|---|
| *B64U 50/19* | (2023.01) |
| *B64U 101/30* | (2023.01) |
| *G06V 10/40* | (2022.01) |
| *G08G 5/26* | (2025.01) |
| *G08G 5/57* | (2025.01) |

(52) U.S. Cl.
CPC ............... *G08G 5/57* (2025.01); *B64U 50/19* (2023.01); *B64U 2101/30* (2023.01); *B64U 2201/20* (2023.01)

(58) Field of Classification Search
CPC .... G06V 20/17; B64U 50/19; B64U 2101/30; B64U 2201/20; B64U 10/13; B64U 50/37; H10H 29/922; H10H 29/39; H10F 77/1692; B65D 83/204; H10D 64/311; H10D 84/0126; G05D 1/10; H04N 7/18; H04Q 9/00
See application file for complete search history.

(56) References Cited

U.S. PATENT DOCUMENTS

| | | | |
|---|---|---|---|
| 2017/0161561 A1* | 6/2017 | Marty .................... | H04N 23/90 |
| 2017/0286887 A1* | 10/2017 | Moran ..................... | G08G 5/55 |
| 2018/0074523 A1 | 3/2018 | Cantrell et al. | |
| 2019/0025828 A1 | 1/2019 | Kuhara | |
| 2019/0145738 A1 | 5/2019 | Chae | |
| 2019/0147252 A1 | 5/2019 | Sawada et al. | |
| 2019/0171208 A1* | 6/2019 | Magalhães de Matos .................. G06N 20/00 | |
| 2019/0246626 A1* | 8/2019 | Baughman ............ | A01M 31/06 |
| 2019/0361434 A1 | 11/2019 | Ohtsuji et al. | |
| 2020/0053325 A1 | 2/2020 | Deyle et al. | |

FOREIGN PATENT DOCUMENTS

| | | | | | |
|---|---|---|---|---|---|
| JP | 2006-285547 | A | 10/2006 | | |
| JP | 2015-207149 | A | 11/2015 | | |
| JP | 2015-228101 | A | 12/2015 | | |
| JP | 2017-077879 | A | 4/2017 | | |
| JP | 2017-114270 | A | 6/2017 | | |
| JP | 2017-181100 | A | 10/2017 | | |
| JP | 2018-100088 | A | 6/2018 | | |
| JP | 2018-516024 | A | 6/2018 | | |
| JP | 2019-102055 | A | 6/2019 | | |
| JP | 2019-121178 | A | 7/2019 | | |
| JP | 2019-121179 | A | 7/2019 | | |
| JP | 2019-148864 | A | 9/2019 | | |
| WO | 2014/033944 | A1 | 3/2014 | | |
| WO | 2017/030188 | A1 | 2/2017 | | |
| WO | WO-2018116486 | A1 * | 6/2018 | .......... | B64C 39/024 |
| WO | 2019/140699 | A1 | 7/2019 | | |

OTHER PUBLICATIONS

SG Office Action for SG Application No. 11202251501U, mailed on Apr. 18, 2024.
International Search Report for PCT Application No. PCT/JP2020/009095, mailed on May 19, 2020.
English translation of Written opinion for PCT Application No. PCT/JP2020/009095, mailed on May 19, 2020.
JP Office Communication for JP Application No. 2023-141981, mailed on Mar. 11, 2025 with English Translation.
JP Office Action for JP Application No. 2023-141981, mailed on Dec. 3, 2024 with English Translation.

\* cited by examiner

Fig.5

| IDENTIFICATION INFORMATION | BATTERY INFORMATION | | POSITION INFORMATION | MONITORING FLAG | STANDBY FLAG |
| --- | --- | --- | --- | --- | --- |
| | REMAINING CAPACITY OF BATTERY | CAPACITY OF BATTERY | | | |
| 001 | 891mAh | 2970mAh | (x1 , y1) | 1 | 0 |
| 002 | 3500mAh | 3500mAh | (x2 , y2) | 0 | 1 |
| 003 | 3160mAh | 3950mAh | (x3 , y3) | 0 | 1 |
| ... | ... | ... | ... | ... | ... |

Fig.6

| MOBILE OBJECT IDENTIFICATION INFORMATION | NORMAL SPEED | MAXIMUM SPEED |
|---|---|---|
| 001 | 25km/h | 50km/h |
| 002 | 15km/h | 20km/h |
| 003 | 30km/h | 70km/h |
| ... | ... | ... |

Fig.8

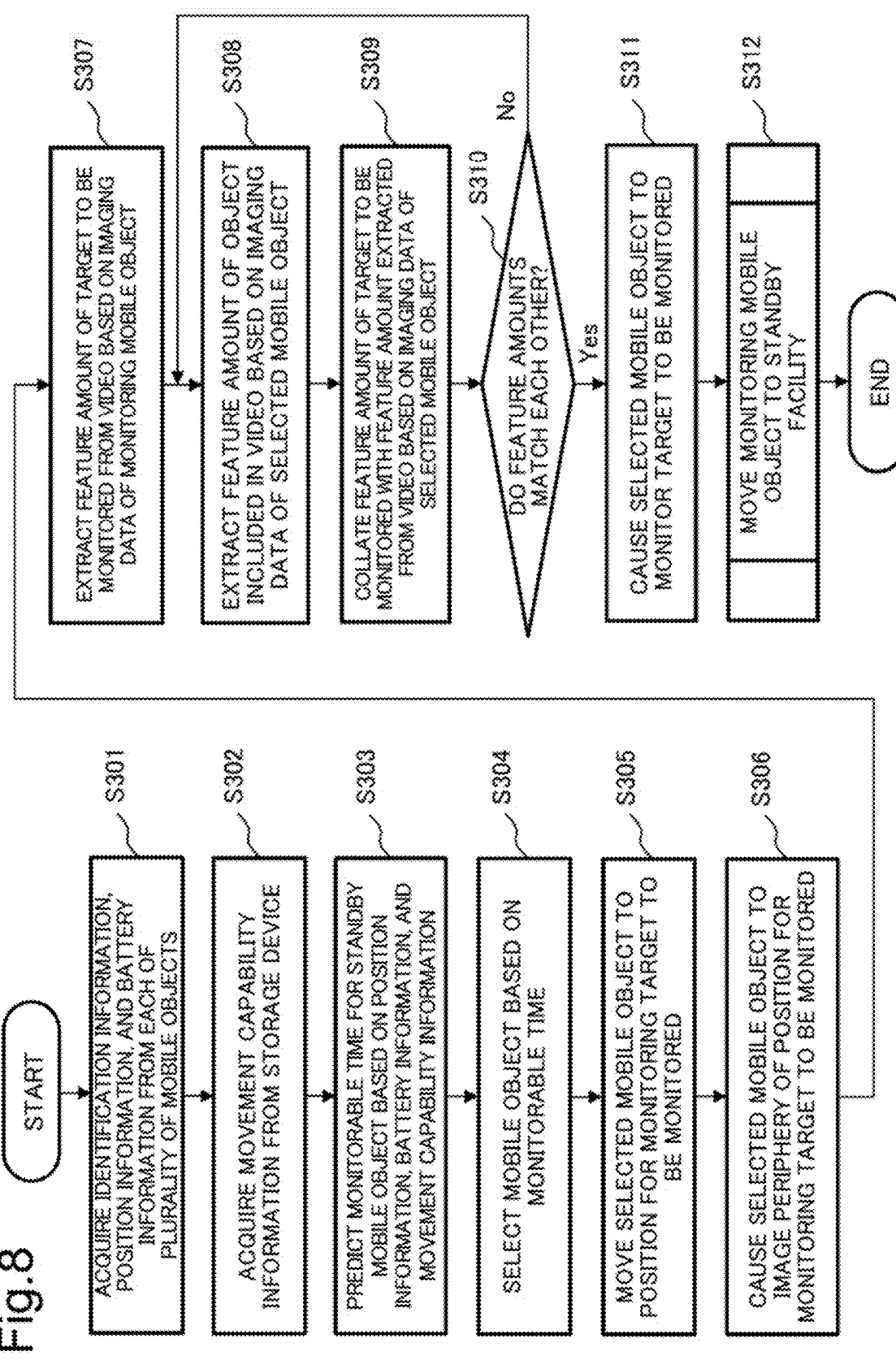

START

S301 ACQUIRE IDENTIFICATION INFORMATION, POSITION INFORMATION, AND BATTERY INFORMATION FROM EACH OF PLURALITY OF MOBILE OBJECTS

S302 ACQUIRE MOVEMENT CAPABILITY INFORMATION FROM STORAGE DEVICE

S303 PREDICT MONITORABLE TIME FOR STANDBY MOBILE OBJECT BASED ON POSITION INFORMATION, BATTERY INFORMATION, AND MOVEMENT CAPABILITY INFORMATION

S304 SELECT MOBILE OBJECT BASED ON MONITORABLE TIME

S305 MOVE SELECTED MOBILE OBJECT TO POSITION FOR MONITORING TARGET TO BE MONITORED

S306 CAUSE SELECTED MOBILE OBJECT TO IMAGE PERIPHERY OF POSITION FOR MONITORING TARGET TO BE MONITORED

S307 EXTRACT FEATURE AMOUNT OF TARGET TO BE MONITORED FROM VIDEO BASED ON IMAGING DATA OF MONITORING MOBILE OBJECT

S308 EXTRACT FEATURE AMOUNT OF OBJECT INCLUDED IN VIDEO BASED ON IMAGING DATA OF SELECTED MOBILE OBJECT

S309 COLLATE FEATURE AMOUNT OF TARGET TO BE MONITORED WITH FEATURE AMOUNT EXTRACTED FROM VIDEO BASED ON IMAGING DATA OF SELECTED MOBILE OBJECT

S310 DO FEATURE AMOUNTS MATCH EACH OTHER?

No

Yes

S311 CAUSE SELECTED MOBILE OBJECT TO MONITOR TARGET TO BE MONITORED

S312 MOVE MONITORING MOBILE OBJECT TO STANDBY FACILITY

END

Fig.15

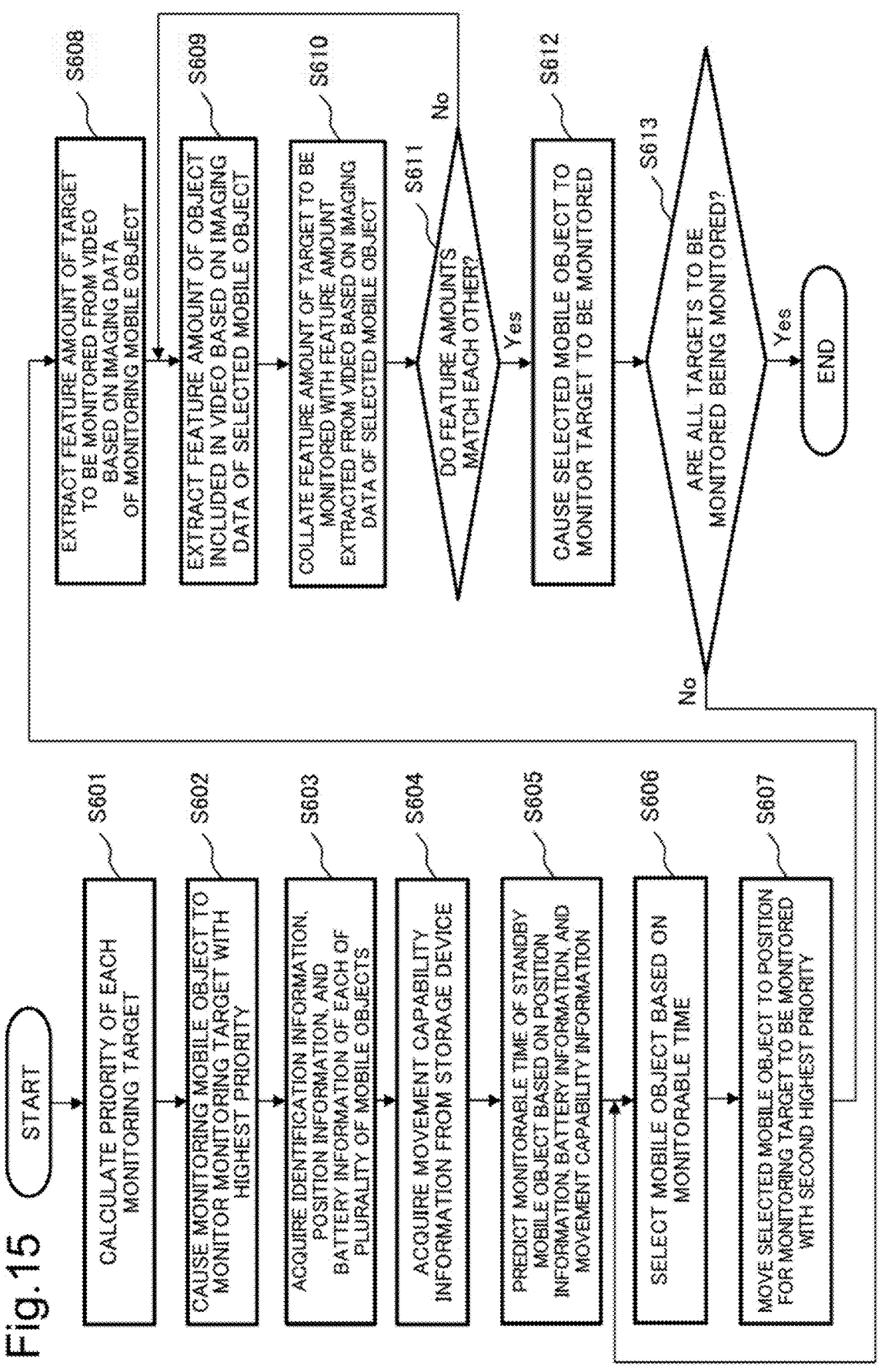

START

S601 CALCULATE PRIORITY OF EACH MONITORING TARGET

S602 CAUSE MONITORING MOBILE OBJECT TO MONITOR MONITORING TARGET WITH HIGHEST PRIORITY

S603 ACQUIRE IDENTIFICATION INFORMATION, POSITION INFORMATION, AND BATTERY INFORMATION OF EACH OF PLURALITY OF MOBILE OBJECTS

S604 ACQUIRE MOVEMENT CAPABILITY INFORMATION FROM STORAGE DEVICE

S605 PREDICT MONITORABLE TIME OF STANDBY MOBILE OBJECT BASED ON POSITION INFORMATION, BATTERY INFORMATION, AND MOVEMENT CAPABILITY INFORMATION

S606 SELECT MOBILE OBJECT BASED ON MONITORABLE TIME

S607 MOVE SELECTED MOBILE OBJECT TO POSITION FOR MONITORING TARGET TO BE MONITORED WITH SECOND HIGHEST PRIORITY

S608 EXTRACT FEATURE AMOUNT OF TARGET TO BE MONITORED FROM VIDEO BASED ON IMAGING DATA OF MONITORING MOBILE OBJECT

S609 EXTRACT FEATURE AMOUNT OF OBJECT INCLUDED IN VIDEO BASED ON IMAGING DATA OF SELECTED MOBILE OBJECT

S610 COLLATE FEATURE AMOUNT OF TARGET TO BE MONITORED WITH FEATURE AMOUNT EXTRACTED FROM VIDEO BASED ON IMAGING DATA OF SELECTED MOBILE OBJECT

S611 DO FEATURE AMOUNTS MATCH EACH OTHER? No / Yes

S612 CAUSE SELECTED MOBILE OBJECT TO MONITOR TARGET TO BE MONITORED

S613 ARE ALL TARGETS TO BE MONITORED BEING MONITORED? No / Yes

END

CONTROL DEVICE, MONITORING SYSTEM, CONTROL METHOD, AND NON-TRANSITORY COMPUTER-READABLE RECORDING MEDIUM

This application is a National Stage Entry of PCT/JP2020/009095 filed on Mar. 4, 2020, the contents of all of which are incorporated herein by reference, in their entirety.

TECHNICAL FIELD

The present disclosure relates to a technology for controlling a mobile object.

BACKGROUND ART

There is a technology of monitoring a target to be monitored by controlling a mobile object such as a multicopter having an imaging function. Since power necessary for operating such a mobile object is supplied from a battery, and thus, an operating time is limited. Therefore, there is a problem that one mobile object cannot continuously monitor a target to be monitored for a long time.

PTL 1 discloses a technology in which a plurality of unmanned aerial vehicles monitor a target to be monitored while taking over monitoring according to an instruction.

PTL 2 discloses a drone security system having a function of relaying a plurality of drones in order to cover a monitoring range.

A user views a video captured by a mobile object and grasps the state of a target to be monitored. As described above, in a case where monitoring is performed using a plurality of mobile objects, a video showing a target to be monitored is switched at the time of takeover of monitoring. Therefore, when monitoring is taken over, a user views a switched video.

Further, PTL 3 as a related literature discloses a technology for causing a mobile object to follow a target to be monitored. PTL 4 discloses a technology for determining whether an unmanned flying object can arrive at a destination. PTL 5 discloses a technology for detecting a mobile object by using a radar and an acoustic signal. PTL 6 discloses a technology for continuously supplying power to a mobile object.

CITATION LIST

Patent Literature

[PTL 1] WO 2018/116486 A
[PTL 2] JP 2018-516024 A
[PTL 3] JP 2019-121178 A
[PTL 4] JP 2017-077879 A
[PTL 5] JP 2017-181100 A
[PTL 6] JP 2018-100088 A

SUMMARY OF INVENTION

Technical Problem

In the technologies disclosed in PTL 1 and PTL 2, a difference in capability of a mobile object is not taken into consideration when determining a mobile object to take over monitoring. Therefore, in a case where monitoring is performed using a plurality of types of mobile objects having different capabilities, there is a possibility that the monitoring is taken over by a mobile object having a shorter monitorable time for a target to be monitored. In a case where a time for which one mobile object can monitor a target to be monitored is short, for example, switching of a video is frequently performed, and thus, it may be difficult for a user who views the video to grasp the state of the target to be monitored.

PTL 3 to PTL 6 do not disclose monitoring using a plurality of types of mobile objects having different capabilities.

The present disclosure has been made in view of the above problems, and an object of the present disclosure is to provide a control device and the like capable of appropriately and continuously monitoring a target to be monitored even in a case where a plurality of mobile objects used for monitoring are a plurality of types of mobile objects having different capabilities.

Solution to Problem

A control device according to an aspect of the present disclosure includes: an acquisition unit that acquires position information, battery information, and movement capability information of each of a plurality of mobile objects; a prediction unit that predicts a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object; a selection unit that selects, based on the monitorable time, at least one mobile object of a plurality of the standby mobile objects; and a control unit that controls the selected mobile object to move to a position for monitoring the target to be monitored.

A control method according to an aspect of the present disclosure includes: acquiring position information, battery information, and movement capability information of each of a plurality of mobile objects; predicting a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object; selecting, based on the monitorable time, at least one mobile object of a plurality of the standby mobile objects; and controlling the selected mobile object to move to a position for monitoring the target to be monitored.

A computer-readable recording medium according to an aspect of the present disclosure stores a program causing a computer to perform: processing of acquiring position information, battery information, and movement capability information of each of a plurality of mobile objects; processing of predicting a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object; processing of selecting, based on the monitorable time, at least one mobile object of a plurality of the standby mobile objects; and processing of controlling the selected mobile object to move to a position for monitoring the target to be monitored.

Advantageous Effects of Invention

According to the present disclosure, it is possible to appropriately monitor a target to be monitored, even in a case where a plurality of mobile objects used for monitoring are a plurality of types of mobile objects having different capabilities.

BRIEF DESCRIPTION OF DRAWINGS

FIG. 5 is a diagram illustrating an example of an operating state information database according to the second example embodiment.

FIG. 6 is a diagram illustrating an example of a movement capability information database according to the second example embodiment.

FIG. 8 is a flowchart illustrating an example of monitoring takeover processing according to the second example embodiment.

FIG. 15 is a flowchart illustrating an example of mobile object addition processing according to the fourth example embodiment.

EXAMPLE EMBODIMENT

Hereinafter, example embodiments of the present invention will be described with reference to the drawings.

First Example Embodiment

A monitoring system including a control device according to a first example embodiment will be described.

Figure 1:
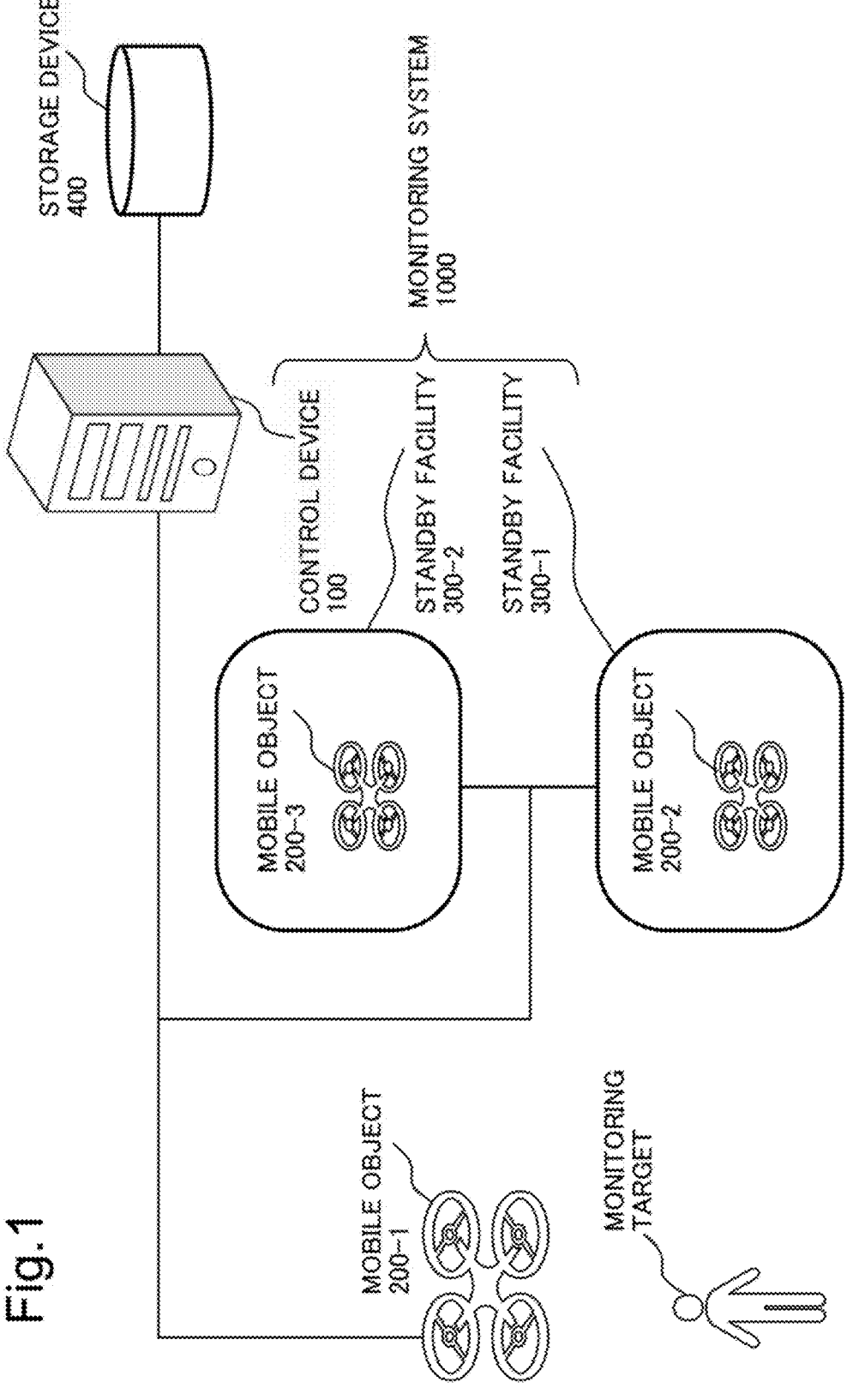
FIG. 1 is a diagram schematically illustrating an example of a configuration of a monitoring system according to a first example embodiment.

FIG. 1 is a diagram schematically illustrating an example of a configuration of a monitoring system 1000 according to the first example embodiment. As illustrated in FIG. 1, the monitoring system 1000 includes a control device 100 and standby facilities 300-1 and 300-2. The control device 100 can communicate with mobile objects 200-1, 200-2, and 200-3, the standby facilities 300-1 and 300-2, and a storage device 400 via wired communication or wireless communication.

Here, the number of mobile objects 200-1, 200-2, and 200-3 and the number of standby facilities 300-1 and 300-2 are not limited to those in this example. The number of mobile objects may be in a range of 3<n (n is a natural number). The number of standby facilities may be within a range of 1<n. In the present disclosure, the mobile objects 200-1, 200-2, . . . , and 200-*n* are also collectively referred to as a mobile object 200. The standby facilities 300-1, 300-2, . . . , and 300-*n* are also collectively referred to as a standby facility 300.

In the present disclosure, the mobile object 200 is, for example, an unmanned aerial vehicle such as a multicopter (also called a multi-rotor helicopter, a multi-rotor, or the like). An unmanned multicopter may be referred to as an unmanned aerial vehicle (UAV), a small unmanned vehicle, or a drone.

The mobile object 200 further includes a position information generation unit that generates position information indicating the position of the mobile object 200 based on a signal transmitted from a positioning satellite, an imaging unit that generates imaging data by imaging, and a communication unit that transmits the position information and the imaging data. Then, the mobile object 200 can monitor a target to be monitored by imaging the target to be monitored while moving. The mobile object 200 transmits imaging data corresponding to a captured video to the control device 100. In addition, the mobile object 200 transmits information regarding an operating state of a mobile object to the control device 100. A mobile object that is monitoring a target to be monitored is also referred to as a "monitoring mobile object". Furthermore, a target to be monitored that is being monitored by the mobile object 200 is also simply referred to as a "monitoring target". In the situation illustrated in FIG. 1, the mobile object 200-1 is the monitoring mobile object. In a case where a predetermined abnormality has been detected, the monitoring mobile object notifies the control device 100 of the detection of the abnormality. Information and data transmitted by the communication unit include identification information that enables identification of a host vehicle from other vehicles.

The standby facility 300 is a facility in which one or more mobile objects 200 can stand by and be charged. The standby facility 300 includes a standby place where the mobile object 200 stands by and a charging facility that charges the mobile object 200. Each standby facility 300 may transmit, to the control device 100, information regarding the operating state of the mobile object that is on standby in each standby facility 300. Here, in a case where the mobile object that is on standby has transmitted the information regarding the operating state to the control device 100, the standby facility 300 does not have to transmit the information regarding the operating state of the mobile object to the control device 100. In the present specification, the mobile object 200 that is on standby in the standby facility 300 means the mobile object 200 that is on standby in the standby place or the charging facility of the standby facility 300. A mobile object that is on standby in the standby facility 300 is also referred to as a "standby mobile object". In the situation illustrated in FIG. 1, the mobile objects 200-2 and 200-3 are the standby mobile objects.

The storage device 400 holds movement capability information, which is information regarding a capability of each mobile object. The storage device 400 may be included in the control device 100.

The control device 100 sequentially receives pieces of imaging data from the monitoring mobile object. Then, the control device 100 transmits the received imaging data to a device including a display (not illustrated). The device including a display (not illustrated) displays a video based on the imaging data to enable a user to view the video.

The communication unit of each mobile object transmits information indicating that there is an abnormality in a case where the mobile object is in an abnormal state. In a case where information transmitted from the monitoring mobile object indicates an abnormal state, the control device 100 acquires information regarding the operating state of the mobile object from each mobile object 200 or each standby facility 300. Further, the control device 100 acquires the movement capability information from the storage device 400. Then, the control device 100 controls the mobile object 200 based on the acquired information.

That is, the monitoring system 1000 according to the first example embodiment is a system in which the control device 100 controls the mobile object 200 based on the information regarding the operating state of the mobile object acquired from each mobile object 200 or each standby facility 300 and the information regarding the capability of the mobile object acquired from the storage device 400.

[Details of Control Device 100]

Figure 2:
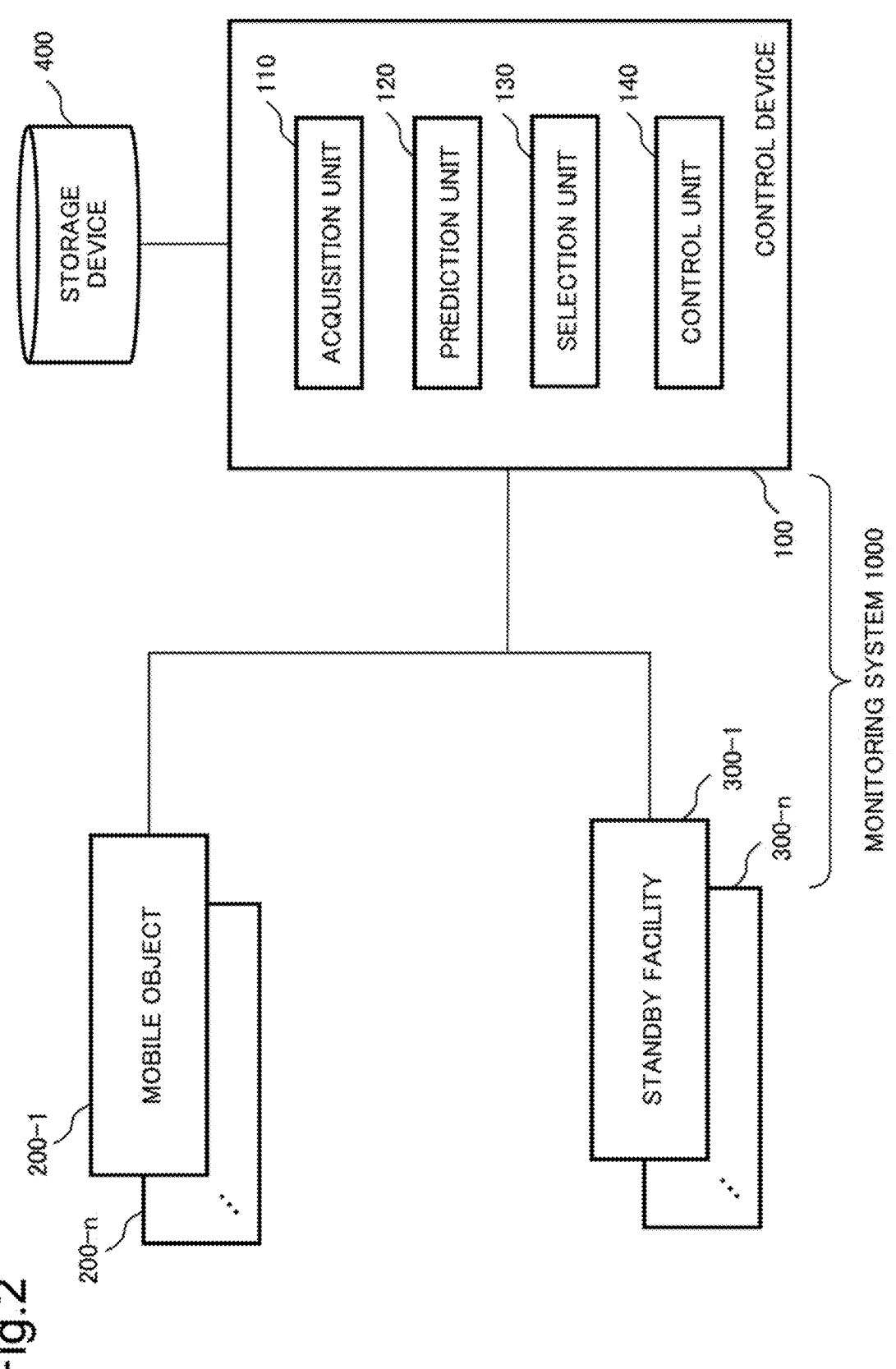
FIG. 2 is a block diagram including an example of a functional configuration of a control device according to the first example embodiment.

Next, a configuration of the control device 100 will be described in detail with reference to FIG. 2. FIG. 2 is a block diagram including an example of a functional configuration of the control device 100 according to the first example embodiment.

As illustrated in FIG. 2, the control device 100 includes an acquisition unit 110, a prediction unit 120, a selection unit 130, and a control unit 140.

The acquisition unit 110 acquires the information regarding the operating state and the movement capability information of each mobile object 200. Specifically, the information regarding the operating state is acquired from each mobile object 200. The information regarding the operating state includes, for example, position information indicating the position of the mobile object 200 and battery information. The battery information is, for example, information indicating a charge capacity of a battery, information indicating a ratio of the charge capacity to the total capacity of the battery, or the like. The acquisition unit 110 may acquire the information regarding the operating state of the mobile object via the standby facility 300.

The acquisition unit 110 acquires the movement capability information of each mobile object 200 from the storage device 400. The movement capability information includes, for example, information on a speed at which each mobile object 200 can move, but is not limited to this example. The movement capability information may further include information indicating an altitude at which each mobile object can move, a power consumption amount per unit time or unit moving distance (that is, fuel consumption), a maximum communication distance, the weight of the mobile object, the size of the mobile object, and the like. The movement capability information is stored in advance in the storage device 400.

In this manner, the acquisition unit 110 acquires the position information, the battery information, and the movement capability information of each of the plurality of mobile objects. The acquisition unit 110 is an example of an acquisition means.

The prediction unit 120 predicts the monitorable time of each standby mobile object. The monitorable time is a time for which the mobile object 200 can continuously monitor a target to be monitored. For example, a time from when the standby mobile object arrives at a position for monitoring a target to be monitored to when the charge capacity of the battery of the arriving standby mobile object reaches a predetermined value is the monitorable time. Here, the predetermined value is, for example, a charge capacity with which the mobile object 200 can move to at least one of the standby facilities 300.

The prediction unit 120 predicts the monitorable time of each standby mobile object based on the information acquired by the acquisition unit 110. Specifically, for example, the prediction unit 120 calculates a distance between the monitoring mobile object and each standby mobile object based on the position information of the monitoring mobile object and the position information of each standby mobile object. Next, the prediction unit 120 calculates a movement time taken by a standby mobile object to move to the position of the monitoring mobile object by further using information on the calculated distance and the movement capability information of the mobile object. The prediction unit 120 further uses the battery information to calculate an operating time from when a standby mobile object is operated to when the charge capacity of the battery reaches the predetermined value. The prediction unit 120 subtracts the movement time from the calculated operating time to predict the monitorable time of each standby mobile object. A method of predicting the monitorable time by the prediction unit 120 is not limited to this example. For example, the prediction unit 120 may calculate the amount of power consumed during the movement time based on the movement capability information after calculating the movement time taken by a standby mobile object to move to the position of the monitoring mobile object. The prediction unit 120 may predict the monitorable time by calculating the operating time from when a standby mobile object moves to the position of the monitoring mobile object to when the charge capacity of the battery of the standby mobile object reaches the predetermined value, based on a remaining capacity, which is a result of subtracting the amount of power consumed during the movement time from the current charge capacity of the battery.

The prediction unit 120 may use the position information of the monitoring target instead of the position information of the monitoring mobile object. At this time, the position information of the monitoring target is calculated based on the position information of the monitoring mobile object and the video captured by the monitoring mobile object.

As described above, the prediction unit 120 predicts the monitorable time, which is a time for which each standby mobile object can monitor a target to be monitored, based on the position information of the monitoring mobile object, which is a mobile object that is monitoring the target to be monitored, among the plurality of mobile objects, the position information of the standby mobile object, which is a mobile object that is on standby, among the plurality of mobile objects, and the battery information and the movement capability information of each of the plurality of mobile objects. The prediction unit 120 is an example of a prediction means.

The selection unit 130 selects the mobile object 200 based on the monitorable time predicted by the prediction unit 120. Specifically, for example, the selection unit 130 selects a mobile object having the longest monitorable time among the standby mobile objects. The selection unit 130 may select a mobile object whose monitorable time is equal to or longer than a predetermined time. In a case where there are a plurality of mobile objects having the longest monitorable time or a plurality of mobile objects having monitorable times equal to or longer than the predetermined time among the standby mobile objects, a standby mobile object that takes the shortest time to move to the position of the monitoring mobile object may be selected. The selection unit 130 may select a plurality of standby mobile objects. That is, the selection unit 130 may select a predetermined number of mobile objects having longer monitorable times from among the standby mobile objects.

In this manner, the selection unit 130 selects at least one mobile object from the plurality of standby mobile objects based on the monitorable time. The selection unit 130 is an example of a selection means.

The control unit 140 controls the mobile object selected by the selection unit 130. Specifically, the control unit 140 performs control to move the mobile object selected by the selection unit 130 to the position of the monitoring mobile object. At this time, the control unit 140 may transmit an instruction to control the selected mobile object to the standby facility 300 and cause the standby facility 300 to control the selected mobile object.

In this manner, the control unit 140 performs control to move the selected mobile object to a position for monitoring a target to be monitored. The control unit 140 is an example of a control means. The position for monitoring a target to be monitored is, for example, a position at which the target can be recognized by using the video captured by the imaging unit of the mobile object 200. Specifically, for example, the position is the sky above the vicinity of the target.

[Operation of Control Device 100]

Next, an operation of the control device 100 will be described with reference to FIG. 3. In the operation described below, it is assumed that the control device 100 is installed in the situation illustrated in FIG. 1. In the present specification, each step of the flowchart is expressed by using a number assigned to each step, such as "S101".

Figure 3:
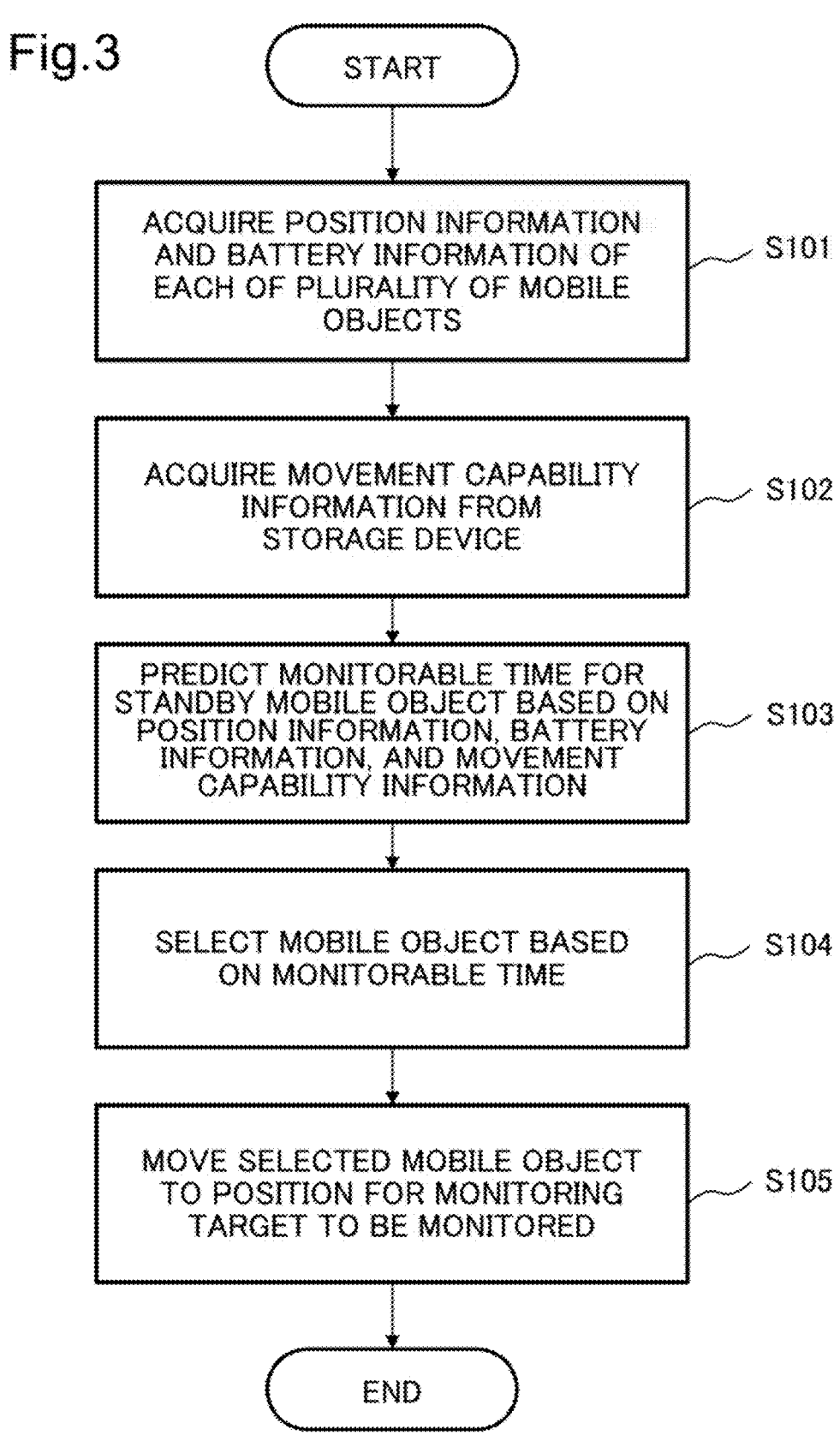
FIG. 3 is a flowchart for describing an example of an operation of the control device according to the first example embodiment.

FIG. 3 is a flowchart for describing an example of the operation of the control device 100. In this operation example, this operation is performed when the control device 100 detects a notification that a predetermined abnormality has occurred from the mobile object 200-1 that is the monitoring mobile object. The predetermined abnormality in this operation example is that the charge capacity of the battery of the mobile object 200-1 becomes equal to or less than the predetermined value, a failure occurs in the mobile object 200-1, or the like. A timing at which this operation is performed is not limited to this example.

The acquisition unit 110 acquires the position information and the battery information from each of a plurality of mobile objects 200 (S101). The acquisition unit 110 acquires the movement capability information from the storage device 400 (S102).

The prediction unit 120 predicts the monitorable times of the mobile objects 200-2 and 200-3 that are the standby mobile objects, based on the position information, the battery information, and the movement capability information of each of the mobile objects 200 acquired by the acquisition unit 110 (S103). In this operation example, the monitorable time predicted by the prediction unit 120 is a time for which each of the mobile objects 200-2 and 200-3 can monitor the target to be monitored at the position of the mobile object 200-1.

The selection unit 130 selects a mobile object from the standby mobile objects based on the predicted monitorable time (S104). That is, the selection unit 130 selects a mobile object having a longer monitorable time from the mobile object 200-2 and the mobile object 200-3.

The control unit 140 performs control to move the selected mobile object to a position for monitoring the target to be monitored (S105). For example, in a case where the mobile object 200-2 is selected, control is performed to move the mobile object 200-2 to the position of the mobile object 200-1.

In this operation example, the processing of S101 and the processing of S102 may be performed in the reverse order or at the same time.

As described above, the control device 100 according to the first example embodiment acquires the position information, the battery information, and the movement capability information of each of the plurality of mobile objects. The control device 100 predicts the monitorable time based on the position information of the monitoring mobile object, the position information of the standby mobile object, and the battery information and the movement capability information of each of the plurality of mobile objects. Then, the control device 100 selects at least one mobile object from the plurality of standby mobile objects based on the monitorable time, and performs control to move the selected mobile object to the position for monitoring the target to be monitored. With this configuration, even in a case where monitoring is performed using a plurality of types of mobile objects having different capabilities, the control device 100 according to the first example embodiment can cause a mobile object having a long monitorable time to take over the monitoring. Therefore, for example, since the control device 100 does not need to frequently switch a video showing the target to be monitored, it is possible to reduce the possibility that a user viewing the video has difficulty in grasping the state of the target to be monitored.

In continuously monitoring the target to be monitored using a plurality of types of mobile objects having different capabilities, it is particularly difficult to appropriately determine a timing for switching a mobile object to perform monitoring or select a mobile object to perform monitoring, and thus it is difficult to appropriately continuously monitor the target to be monitored. On the other hand, since the control device 100 according to the first example embodiment has the above configuration, it is possible to obtain an effect that the target to be monitored can be appropriately and continuously monitored even in a case where a plurality of mobile objects used for monitoring are a plurality of types of mobile objects having different capabilities.

The control device 100 according to the first example embodiment selects, for example, a mobile object having the longest monitorable time among the standby mobile objects. As a result, the control device 100 can cause a mobile object having a longer monitorable time among the standby mobile objects to take over the monitoring.

In a case where there are a plurality of mobile objects having the longest monitorable time, the control device 100 according to the first example embodiment may select a standby mobile object that takes the shortest time to move to the position of the monitoring mobile object. As a result, the control device 100 can cause a mobile object that arrives earliest at the position of the monitoring mobile object among the mobile objects having the longest monitorable time to take over the monitoring. Therefore, for example, the control device 100 can reduce the possibility that the monitoring performed by the monitoring mobile object is stopped before a standby mobile object arrives at the position of the monitoring mobile object.

Second Example Embodiment

Next, a monitoring system including a control device according to a second example embodiment will be described. In the second example embodiment, an operation in a case where the control device detects information indicating that an abnormality has occurred in a monitoring mobile object from the monitoring mobile object will be described.

Figure 4:
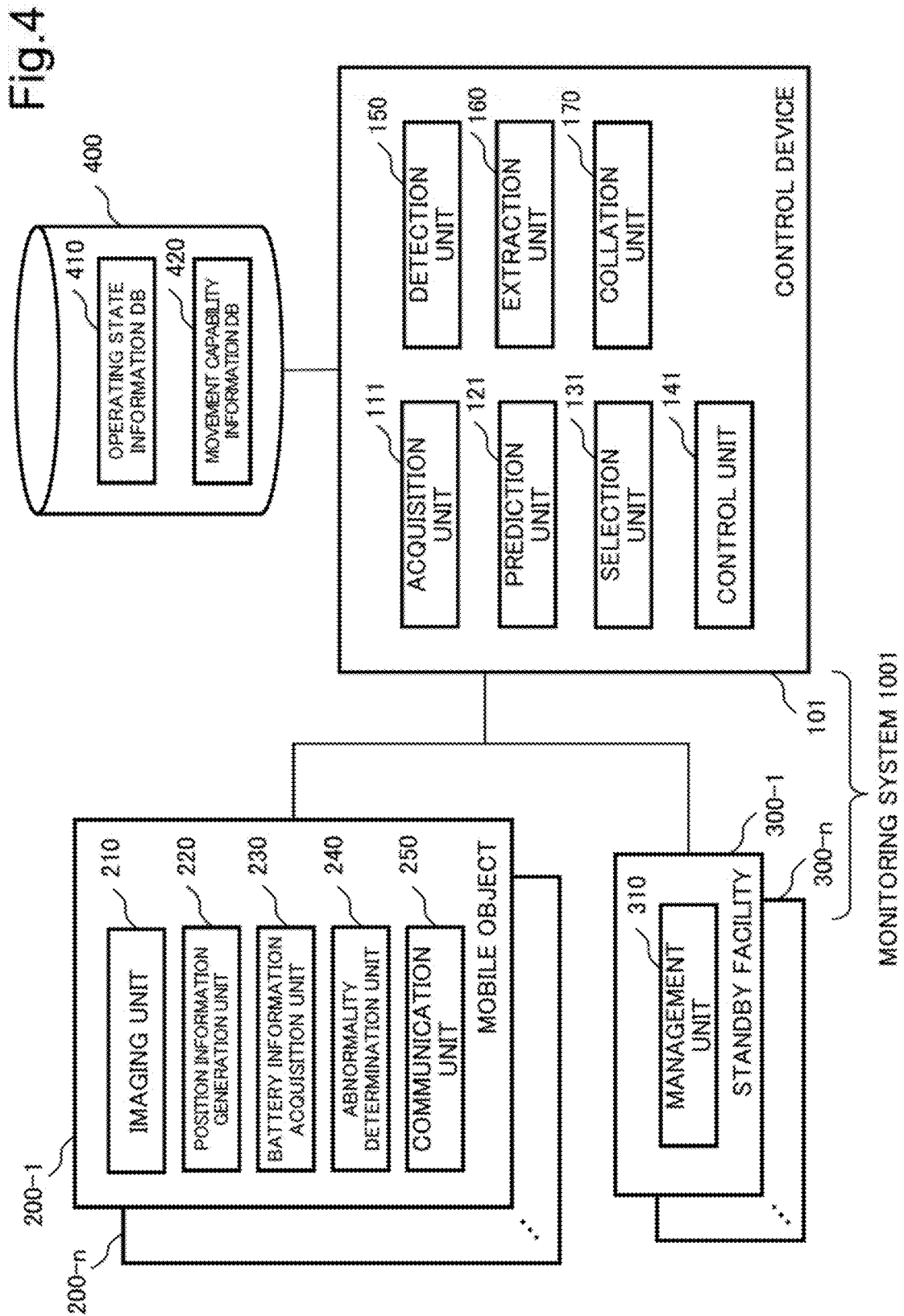
FIG. 4 is a block diagram illustrating an example of a functional configuration of a monitoring system according to a second example embodiment.

FIG. 4 is a block diagram illustrating an example of a configuration of a monitoring system 1001 according to the second example embodiment. As illustrated in FIG. 4, the monitoring system 1001 is similar to the monitoring system 1000 described in the first example embodiment except that the monitoring system 1001 includes a control device 101 instead of the control device 100 in the first example embodiment. That is, the monitoring system 1001 includes the control device 101 and standby facilities 300-1, 300-2, . . . , and 300-n. A description of the configuration and operation of the monitoring system 1001 illustrated in FIG. 4 overlapping with those of the first example embodiment will be omitted.

[Details of Mobile Object 200]

As illustrated in FIG. 4, a mobile object 200 includes an imaging unit 210, a position information generation unit 220, a battery information acquisition unit 230, an abnormality determination unit 240, and a communication unit 250. The mobile object 200 can communicate with the control device 101 and the standby device 300 via wired communication or wireless communication. The mobile object 200 can also communicate with other mobile objects.

The imaging unit 210 images a predetermined range and generates imaging data. The imaging data includes color information or pixel value information of each pixel of a frame included in a moving image or a still image. The imaging data may include a time at which the imaging data is generated, and the like. The imaging unit 210 sequentially transmits the generated imaging data to the control device 101 via the communication unit 250. The imaging unit 210 of the mobile object that is on standby in the standby facility 300 does not have to generate the imaging data. That is, the standby mobile object does not have to transmit the imaging data to the control device 101.

In a case where the control device 101 controls the mobile object 200 to perform monitoring, the imaging unit 210 performs imaging in such a way that a target to be monitored falls within an imaging range of the imaging unit 210. At this time, the imaging unit 210 may perform control to move the mobile object 200 in an imaging direction of the imaging unit 210 in such a way that the target to be monitored falls within the angle of view, or may perform control to move the mobile object 200 in such a way that the target to be monitored falls within the angle of view. By performing such control, the mobile object 200 tracks the target to be monitored. Examples of a method of performing imaging in such a way that a target to be monitored is within the angle of view include a method of detecting a target to be monitored from imaging data of the next frame by using information on an appearance of the target to be monitored detected from imaging data of the previous frame, and performing imaging in such a way that the detected target to be monitored is positioned at the center of the angle of view.

The imaging unit 210 may detect information on the category of an object included in the imaging data. The category information is, for example, information indicating the type of an object such as a person, a crowd, an automobile, or a bicycle. As a result, the mobile object 200 can change an algorithm for detecting a target to be monitored according to the category of the target to be monitored, and thus can detect the target to be monitored more accurately. The imaging unit 210 may transmit the detected category information to the control device 101 via the communication unit 250.

The position information generation unit 220 acquires position information indicating the position of the mobile object 200. For example, the position information generation unit 220 may acquire the position information by a positioning signal receiving device mounted on the mobile object 200. Specifically, for example, the position information generation unit 220 may be configured to receive a signal transmitted from a positioning satellite of a global navigation satellite system (GNSS) such as a global positioning system (GPS) satellite, and acquire position information indicating the position of a host vehicle based on the received signal. The position information generation unit 220 transmits the acquired position information to the control device 101 via the communication unit 250.

The battery information acquisition unit 230 acquires battery information, which is information regarding a battery mounted on the mobile object 200. The battery information acquisition unit 230 transmits the acquired battery information to the control device 101 via the communication unit 250.

The abnormality determination unit 240 determines whether the mobile object 200 is in an abnormal state. Specifically, the abnormality determination unit 240 determines that the mobile object 200 is in an abnormal state in a case where the charge capacity of the battery mounted on the mobile object 200 becomes equal to or less than a predetermined value, or in a case where a failure of a mechanism and a sensor mounted on the mobile object 200 is detected. For example, the abnormality determination unit 240 may determine that the mobile object 200 is in an abnormal state in a case where a monitoring target cannot be detected, in a case where the number of monitoring targets is changed, or in a case where the category of the monitoring target is changed, or may determine that the mobile object 200 is in an abnormal state in a case where a distance to another mobile object is equal to or less than a predetermined value. In a case where it is determined that the mobile object 200 is in an abnormal state, the abnormality determination unit 240 transmits information indicating the abnormal state to the control device 101 via the communication unit 250.

The communication unit 250 communicates with the control device 101 and the standby facility 300. Specifically, the communication unit 250 transmits the imaging data, the position information, the battery information, and the information indicating an abnormal state to the control device 101. When transmitting each of the imaging data, the position information, the battery information, and the information indicating an abnormal state, the communication unit 250 transmits identification information of the mobile object 200, information indicating whether the mobile object 200 is performing monitoring, and information indicating whether the mobile object 200 is on standby to the control device 101. The mobile object 200 may transmit these pieces of information to the control device 101 via the standby facility 300.

The communication unit 250 receives information regarding control of a mobile object from the control device 101. The communication unit 250 may receive information regarding control of a mobile object via the standby facility 300.

[Details of Standby Facility 300]

As illustrated in FIG. 4, the standby facility 300 includes a management unit 310. The management unit 310 manages a standby place and a charging facility of the standby facility 300, and a standby mobile object that is on standby in the standby facility 300. Specifically, the management unit 310 acquires information indicating the availability of the standby place and the charging facility of the standby facility 300 and transmits the information to the control device 101. The information indicating the availability of the standby place and the charging facility of the standby facility 300 is also simply referred to as "information indicating the availability of a standby facility". The information indicating the availability of a standby facility includes the position information of each standby facility 300. The management unit 310 may acquire the identification information of the standby mobile object, the battery information of the standby mobile object, and the position information of the standby mobile object from the standby mobile object, and transmit the acquired information to the control device 101. Here, the position information of the standby mobile object may be the position information of the standby facility 300.

Furthermore, in a case where the management unit 310 receives information regarding control of a mobile object from the control device 101, the management unit 310 may control the mobile object based on the received information.

[Details of Control Device 100]

As illustrated in FIG. 4, the control device 101 includes an acquisition unit 111, a prediction unit 121, a selection unit 131, a control unit 141, a detection unit 150, an extraction unit 160, and a collation unit 170. The acquisition unit 111, the prediction unit 121, the selection unit 131, and the control unit 141 perform operations described below in addition to the operations of the acquisition unit 110, the prediction unit 120, the selection unit 130, and the control unit 140 described in the first example embodiment, respectively.

The acquisition unit 111 sequentially acquires identification information of the monitoring mobile object and imaging data from the monitoring mobile object. The acquisition unit 111 transmits the acquired imaging data to a device including a display (not illustrated). The acquisition unit 111 may store the identification information and the imaging data in association with each other in a storage device 400.

In addition, the acquisition unit 111 acquires the identification information, information regarding an operating state, and movement capability information of each mobile object 200. Specifically, in a case where the detection unit 150 to be described later detects that the information indicating an abnormal state is received by a communication means (not illustrated) (hereinafter, also simply referred to as a case where the information indicating an abnormal state has been detected), the acquisition unit 111 acquires the identification information and the information regarding the operating state of each mobile object 200 from each mobile object 200. The acquisition unit 111 stores the acquired identification information and the information regarding the operating state in association with each other in an operating state information database 410 included in the storage device 400. In the present specification, the database is also referred to as "DB".

FIG. 5 is a diagram illustrating an example of the operating state information DB 410. In the example of FIG. 5, the identification information and the information regarding the operating state of each mobile object 200 are stored in association with each other. In this example, the information regarding the operating state is the battery information, the position information, a monitoring flag, and a standby flag. The monitoring flag is information indicating whether the mobile object 200 is the monitoring mobile object. In this example, the monitoring flag set to "1" indicates that the mobile object is the monitoring mobile object. The standby flag is information indicating whether the mobile object 200 is the standby mobile object that is on standby in the standby facility 300. In this example, the standby flag set to "1" indicates that the mobile object is the standby mobile object. In this example, information indicating the capacity of the battery and the remaining capacity of the battery is shown as the battery information. For example, the second line of FIG. 5 indicates that the remaining capacity of a battery of a mobile object with the identification information "001" is "891 mAh", the capacity of the battery is "2970 mAh", the position information is "(x1,y1)", the monitoring flag is "1", and the standby flag is "0".

In a case where the detection unit 150 has detected the information indicating an abnormal state, the acquisition unit 111 reads a movement capability information DB 420 from the storage device 400 and acquires the movement capability information of each mobile object 200. FIG. 6 is a diagram illustrating an example of the movement capability information DB 420. In the example of FIG. 6, the identification information of each mobile object 200 and information indicating a normal speed and a maximum speed of each mobile object, which is the movement capability information, are stored in association with each other. For example, the second line of FIG. 6 indicates that the normal speed of the mobile object with the identification information "001" is "25 km/h" and the maximum speed is "50 km/h". Here, the normal speed indicates a speed at which the mobile object 200 can be operated most efficiently (that is, a speed at which the mobile object 200 can move with the best fuel efficiency).

The acquisition unit 111 may acquire information acquired from each mobile object 200 via the standby facility 300. For example, the acquisition unit 111 may acquire information from the monitoring mobile object via the standby facility 300 installed at a position closer than the monitoring mobile object from the control device 101. As a result, even in a case where a communication situation between the monitoring mobile object and the control device 101 is unstable, the control device 101 can acquire information more reliably.

The acquisition unit 111 acquires information indicating the availability of a standby facility from the standby facility 300.

The prediction unit 121 predicts a monitorable time of each mobile object 200 based on the information regarding the operating state and the movement capability information acquired by the acquisition unit 111.

For example, when predicting the monitorable time of the standby mobile object, in a case where the normal speed is used as the movement capability information, the prediction unit 121 calculates a movement time of a case where the standby mobile object moves to the position of the monitoring mobile object at the normal speed. Then, the prediction unit 121 further uses the battery information to calculate an operating time from when a standby mobile object is operated to when the charge capacity of the battery reaches the predetermined value. The prediction unit 121 subtracts the movement time from the calculated operating time to predict the monitorable time of each standby mobile object.

The prediction unit 121 predicts a cruising distance of each mobile object 200. The cruising distance is a distance by which the mobile object 200 can cruise without charging the battery. For example, the prediction unit 121 predicts the cruising distance of the monitoring mobile object based on the charge capacity of the battery and the movement capability information of the monitoring mobile object.

The selection unit 131 selects at least one mobile object among the mobile objects 200 based on the monitorable time predicted by the prediction unit 121. For example, in a case where the prediction unit 121 has predicted the monitorable times of the standby mobile objects, the selection unit 131 selects at least one mobile object from the standby mobile objects.

The control unit 141 controls the mobile object selected by the selection unit 131. Specifically, for example, in a case where the selection unit has selected the standby mobile object, control is performed to move the selected mobile object to the position of the monitoring mobile object. Once the selected mobile object moves to the position of the monitoring mobile object, the control unit 141 causes the selected mobile object to image the periphery of the position and generate imaging data. Here, once a target to be monitored is detected from the imaging data of the selected mobile object by processing performed by the extraction unit 160 and the collation unit 170 to be described later, the control unit 141 controls the selected mobile object to monitor the target to be monitored.

The control unit 141 performs control to move the monitoring mobile object to the standby facility 300. Specifically, the control unit 141 specifies an available standby facility 300 located closest to the position of the monitoring mobile object based on the information indicating the availability of a standby facility and a distance from the position of the monitoring mobile object to each standby facility. The control unit 141 moves the monitoring mobile object to the specified standby facility. In a case where the cruising distance of the monitoring mobile object is insufficient for the distance from the position of the monitoring mobile object to the specified standby facility, the control unit 141 moves the monitoring mobile object to the standby facility located closest to the position of the monitoring mobile object. In this case, the standby mobile object that is on standby in the standby facility located closest to the position of the monitoring mobile object is moved to another standby facility.

The detection unit 150 detects the information indicating an abnormal state from the monitoring mobile object.

The extraction unit 160 extracts a feature amount from a video based on the imaging data generated by the mobile object 200. Specifically, for example, the extraction unit 160 decodes imaging data generated by the monitoring mobile object, generates an analog video, and extracts a feature amount of a monitoring target from the generated analog video. The extraction unit 160 extracts a feature amount of an object included in a video based on imaging data generated after the selected mobile object moves to the position of the monitoring mobile object.

In this manner, the extraction unit 160 extracts a feature amount of an object included in a video based on imaging data transmitted from the selected mobile object and a feature amount of a monitoring target included in the video based on imaging data transmitted from the monitoring mobile object. The extraction unit 160 is an example of an extraction means.

The collation unit 170 performs feature amount collation by using the feature amounts extracted by the extraction unit 160. Specifically, the feature amount of the monitoring target extracted from the video based on the imaging data generated by the monitoring mobile object is collated with the feature amount of the object included in the video based on the imaging data generated by the selected mobile object. In a case where the feature amount of the monitoring target and the feature amount of the object match each other, the imaging data generated by the selected mobile object includes the monitoring target. That is, the monitoring target is detected from the imaging data of the selected mobile object by the collation processing performed by the collation unit 170.

In this manner, the collation unit 170 collates the feature amount of the object with the feature amount of the target to be monitored. The collation unit 170 is an example of a collation means.

[Operation of Control Device 101]

Next, an operation of the control device 101 will be described with reference to FIGS. 7, 8, and 9. In the operation described below, it is assumed that the control device 101 is installed instead of the control device 100 in the situation illustrated in FIG. 1.

Figure 7:
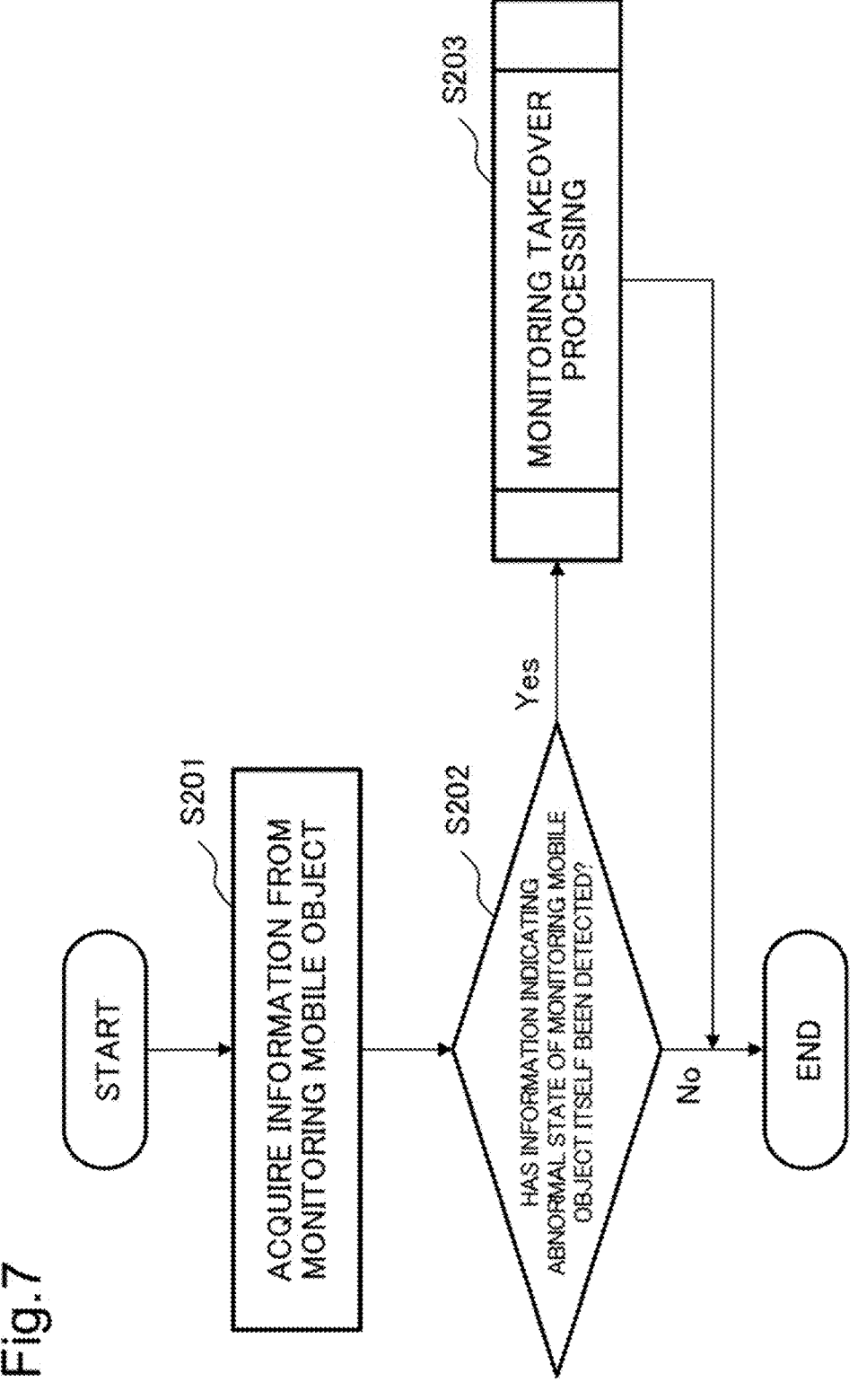
FIG. 7 is a flowchart illustrating an example of an operation of a control device according to the second example embodiment.

FIG. 7 is a flowchart illustrating an example of the operation of the control device 101. The acquisition unit 111 acquires information including imaging data from the monitoring mobile object (S201). At this time, the acquisition unit 111 may acquire, in addition to the imaging data, information detected in the monitoring mobile object, such as the identification information of the monitoring mobile object, information on the category of the monitoring target, and the position information of the monitoring mobile object.

In a case where the detection unit 150 has detected information indicating an abnormal state of the monitoring mobile object itself from the monitoring mobile object (Yes in S202), the control device 101 performs monitoring takeover processing to be described later (S203).

In a case where the detection unit 150 has not detected the information indicating an abnormal state of the monitoring mobile object itself (No in S202), the control device 101 ends the operation. The control device 101 repeats the processings of S201 to S203 as long as the monitoring mobile object continues monitoring.

FIG. 8 is a flowchart for describing an example of the monitoring takeover processing performed by the control device 101. The processing of S301 to S305 correspond to the processings of S101 to S105 of the flowchart illustrated in FIG. 3. That is, the control device 101 acquires the position information, the battery information, and the movement capability information of each of a plurality of mobile objects, predicts the monitorable time of each standby mobile object based on the acquired position information, battery information, and movement capability information, selects a mobile object based on the predicted monitorable time, and moves the selected mobile object to a position for monitoring the monitoring target. Therefore, a detailed description of the processings of S301 to S305 will be omitted. In this operation example, it is assumed that the mobile object 200-2 is selected in the processing of S205.

After the selected mobile object moves to the position of the monitoring mobile object, that is, the position for monitoring the target to be monitored, the control unit 141 causes the selected mobile object to image the periphery of the position for monitoring the target to be monitored (S306). For example, after the mobile object 200-2 moves to the position of the mobile object 200-1, the control unit 141 causes the mobile object 200-2 to image the periphery of the position.

The extraction unit 160 acquires imaging data generated by the monitoring mobile object, and extracts a feature amount of the monitoring target from a video based on the imaging data generated by the monitoring mobile object (S307). The extraction unit 160 acquires imaging data generated by the selected mobile object, and extracts a feature amount of an object included in a video based on the imaging data generated by the selected mobile object (S308). For example, the extraction unit 160 extracts the feature amount of the monitoring target from the video based on the imaging data of the mobile object 200-1, and extracts the feature amount of the object included in the video based on the imaging data of the mobile object 200-2.

The collation unit 170 collates the feature amount of the monitoring target with the feature amount of the object (S309). In a case where the collation result indicates that the feature amount of the monitoring target matches the feature amount of the object (Yes in S310), the control unit 141 causes the selected mobile object to monitor the target to be monitored (S311). For example, in a case where the feature amount of the monitoring target and the feature amount of the object match each other, the control unit 141 causes the mobile object 200-2 to monitor the monitoring target. In a case where the collation result indicates that the feature amount of the monitoring target and the feature amount of the object do not match each other (No in S310), the control device 101 performs the processing of S308. For example, at this time, the extraction unit 160 extracts the feature amount again from imaging data obtained by further imaging the periphery of the position of the monitoring mobile object by the mobile object 200-2.

After the processing of S311, the control unit 141 moves the monitoring mobile object to the standby facility 300 (S312). For example, once the mobile object 200-2 is caused to monitor the target to be monitored, the control unit 141 moves the mobile object 200-1 to any one of the standby facilities 300.

Figure 9:
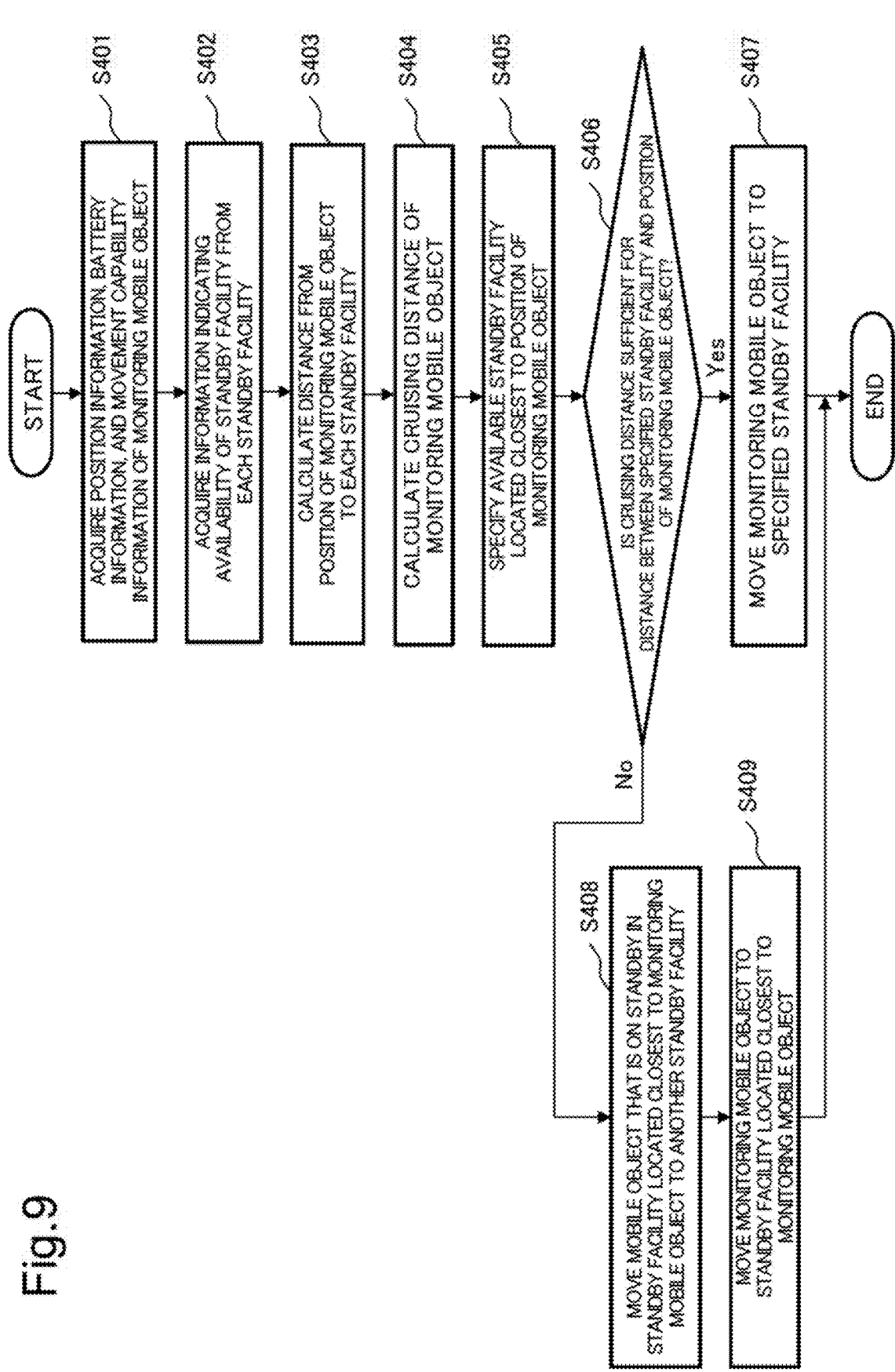
FIG. 9 is a flowchart illustrating an example of processing of moving a monitoring mobile object to a standby facility according to the second example embodiment.

FIG. 9 is a flowchart illustrating an example of processing of moving the monitoring mobile object to the standby facility.

The acquisition unit 111 acquires the position information, the battery information, and the movement capability information of the monitoring mobile object (S401). Then, the acquisition unit 111 acquires the information indicating the availability of a standby facility from each standby facility 300 (S402). In this operation example, it is assumed that the standby facility 300-1 is available and the standby facility 300-2 is not available.

The prediction unit 121 calculates a distance from the position of the monitoring mobile object to each standby facility 300 by using the position information of the monitoring mobile object and the position information of each standby facility 300 (S403). Then, the prediction unit 121 calculates the cruising distance of the monitoring mobile object by using the battery information and the movement capability information of the monitoring mobile object (S404). For example, the prediction unit 121 calculates a distance between the mobile object 200-1 and the standby facility 300-1 and a distance between the mobile object 200-1 and the standby facility 300-2. The prediction unit 121 calculates the cruising distance of the mobile object 200-1.

The control unit 141 specifies an available standby facility 300 located closest to the position of the monitoring mobile object based on the information indicating the availability of a standby facility and information on the distance from the position of the monitoring mobile object to each standby facility 300 (S405). In a case where the cruising distance of the monitoring mobile object is sufficient for the distance between the specified standby facility and the position of the monitoring mobile object (Yes in S406), the control unit 141 moves the monitoring mobile object to the specified standby facility (S407). For example, in a case where the standby facility 300-1 is specified, the control unit 141 determines whether the cruising distance of the mobile object 200-1 is sufficient for the distance between the mobile object 200-1 and the standby facility 300-1. In a case where the cruising distance of the mobile object 200-1 is sufficient, the control unit 141 moves the mobile object 200-1 to the standby facility 300-1.

In a case where the cruising distance of the monitoring mobile object is insufficient for the distance between the specified standby facility and the position of the monitoring mobile object (No in S406), the control unit 141 moves a mobile object that is on standby in a standby facility located closest to the monitoring mobile object to another standby facility (S408). The control unit 141 moves the monitoring mobile object to the standby facility located closest to the monitoring mobile object (S409). For example, in a case where the cruising distance of the mobile object 200-1 is not sufficient for the distance between the mobile object 200-1 and the standby facility 300-1 and is sufficient for the distance between the mobile object 200-1 and the standby facility 300-2, the control unit 141 moves the mobile object 200-3 to the standby facility 300-1. Then, the control unit 141 moves the mobile object 200-1 to the standby facility 300-2.

As described above, even in a case where monitoring is performed using a plurality of types of mobile objects having different capabilities, the control device 101 according to the second example embodiment can cause a mobile object having a long monitorable time to take over the monitoring. Therefore, for example, since the control device 101 does not need to frequently switch a video showing the target to be monitored, it is possible to reduce the possibility that a user viewing the video has difficulty in grasping the state of the target to be monitored. Therefore, the control device 101 according to the second example embodiment can obtain an effect that a monitoring target can be appropriately monitored even in a case where a plurality of mobile objects used for monitoring are a plurality of types of mobile objects having different capabilities.

The control device 101 according to the second example embodiment extracts a feature amount of an object included in a video based on imaging data transmitted from a selected mobile object and a feature amount of the monitoring target included in a video based on imaging data transmitted from the monitoring mobile object, and collates the feature amount of the object with the feature amount of the monitoring target. In a case where the feature amount of the object and the feature amount of the monitoring target match each other, the control device 101 controls the selected mobile object to monitor the monitoring target. With this configuration, the control device 101 according to the second example embodiment causes the selected mobile object to perform monitoring after the object imaged by the selected mobile object and the monitoring target imaged by the monitoring mobile object match each other, as a result of which, an effect that the selected mobile object can reliably take over the monitoring of the monitoring target can be obtained.

The control device 101 according to the second example embodiment acquires the information indicating the availability of a standby facility in which a mobile object can stand by, and moves the monitoring mobile object to an available standby facility located closest to the position of the monitoring mobile object based on the information indicating the availability of a standby facility. With this configuration, for example, the control device 101 according to the second example embodiment can charge a mobile object whose charge capacity of the battery is small in the standby facility and use the mobile object for monitoring again, as a result of which an effect that monitoring can be performed more continuously can be obtained.

The control device 101 according to the second example embodiment predicts the cruising distance of the monitoring mobile object based on the battery information of the monitoring mobile object and the movement capability information of the monitoring mobile object, and in a case where the cruising distance is insufficient for a distance from the position of the monitoring mobile object to a standby facility to which the monitoring mobile object is to be moved, the control device 101 moves a mobile object that is on standby in the standby facility located closest to the monitoring mobile object to another standby facility, and move the monitoring mobile object to the standby facility located closest to the monitoring mobile object. With this configuration, the control device 101 according to the second example embodiment, for example, can change the standby facility to which the monitoring mobile object is to be moved according to the charge capacity of the battery of the monitoring mobile object, and thus, it is possible to obtain an effect of reducing the possibility that a mobile object to be moved runs out of the battery before moving to the standby facility.

MODIFIED EXAMPLE 1

In a case where there are a plurality of standby facilities 300, each standby facility 300 does not have to include both the standby place and the charging facility. It is sufficient if at least one of the plurality of standby facilities 300 includes the charging facility.

At this time, information indicating whether each standby facility 300 includes only the charging facility, only the standby place, or both the standby place and the charging facility (hereinafter, referred to as standby facility information) is stored in the storage device 400 in advance.

In Modified Example 1, in the processing of moving the monitoring mobile object to the standby facility 300 (S312), the control device 101 further uses the standby facility information to move the monitoring mobile object.

The acquisition unit 111 further acquires the standby facility information in addition to the position information, the battery information, and the movement capability information of the monitoring mobile object, and the information indicating the availability of a standby facility.

The prediction unit 121 selects a standby facility including a charging facility among the standby facilities 300 based on the standby facility information. The prediction unit 121 calculates a distance between the position of the monitoring mobile object and each of the selected standby facilities.

The control unit 141 specifies, by using the information indicating the availability of a standby facility, a standby facility of which the charging facility is available and which is located closest to the position of the monitoring mobile object among the standby facilities each including the charging facility. In a case where the cruising distance of the monitoring mobile object is sufficient for the distance from the position of the monitoring mobile object to the standby facility, the control unit 141 moves the monitoring mobile object to the standby facility. In a case where the cruising distance of the monitoring mobile object is insufficient for the distance from the position of the monitoring mobile object to the standby facility, the control unit 141 moves a standby mobile object in the charging facility of the standby facility located closest to the monitoring mobile object among the standby facilities each including the charging facility to another standby facility. The control unit 141 moves the monitoring mobile object to the standby facility located closest to the monitoring mobile object among the standby facilities each including the charging facility.

As a result, even in a case where not all the standby facilities 300 include the charging facility, the control device 101 according to Modified Example 1 can reliably charge the monitoring mobile object by using the standby facility 300 including the charging facility.

MODIFIED EXAMPLE 2

In a case where no monitoring target is detected by the mobile object 200, the control unit 141 may cause the mobile object 200 to search for a monitoring target for a predetermined time.

In a case where the imaging unit 210 cannot perform imaging in such a way that a monitoring target falls within the angle of view of the imaging unit 210, the abnormality determination unit 240 determines that the mobile object 200 is in an abnormal state. The communication unit 250 transmits information indicating an abnormal state to the control device 101. Examples of a case where imaging cannot be performed in such a way that a monitoring target falls within the angle of view of the imaging unit 210 includes a case where the mobile object 200 has been able to detect a monitoring target from imaging data of the previous frame and has not been able to detect the monitoring target from imaging data of the next frame.

At this time, the detection unit 150 detects the information indicating an abnormal state, including information indicating that the monitoring target has not been detected by the monitoring mobile object.

The control unit 141 causes the monitoring mobile object to monitor a predetermined range including a position where the monitoring target has not been detected. Then, in a case where the monitoring mobile object has not detected the monitoring target within a predetermined time, the monitoring mobile object is moved to the standby facility.

As a result, in a case where the monitoring mobile object has not been able to detect the monitoring target, the control device 101 according to Modified Example 2 can move the monitoring mobile object to the standby facility before the battery of the monitoring mobile object runs out.

MODIFIED EXAMPLE 3

The selection unit 131 may select the mobile object 200 based on the information on the category of the target to be monitored.

For example, in a case where the target to be monitored is an automobile, there is a possibility that a mobile object having a slow speed cannot track the target to be monitored. In this case, it is desirable to perform monitoring by using a mobile object having a high speed. In a case where the target to be monitored is a person, it is conceivable to perform monitoring by using a mobile object movable at a speed at which the person can be imaged.

Specifically, in the processing of S301, the acquisition unit 111 acquires the information on the category of the monitoring target from the monitoring mobile object.

In the processing of S304, the selection unit 131 selects at least one of the standby mobile objects based on the monitorable time and the information on the category of the monitoring target. For example, in a case where the monitoring target is an automobile, the selection unit 131 selects a mobile object having a maximum speed of 60 km/h or higher from among mobile objects whose monitorable time is equal to or longer than a predetermined value.

As a result, the control device 101 according to Modified Example 3 can select, for example, a mobile object 200 that can monitor even a target to be monitored having a high moving speed, and thus, the target to be monitored can be appropriately and continuously monitored.

Third Example Embodiment

Next, a monitoring system including a control device according to a third example embodiment will be described. In the third example embodiment, a description will be given of an operation in a case where a control device has detected a notification from a monitoring mobile object that a distance to another mobile object is equal to or less than a predetermined value when a plurality of the monitoring mobile objects monitor each target to be monitored.

More specifically, in a case where a plurality of monitoring mobile objects are being operated and the plurality of monitoring mobile objects approach each other, there is a possibility that monitoring targets of the monitoring mobile objects join. Therefore, in the third example embodiment, an example of control of a mobile object 200 in a case where a plurality of monitoring targets join will be described. Examples of a case where a plurality of monitoring targets join includes a case where the monitoring targets are persons and the persons gather. The case where a plurality of monitoring targets join is not limited to this example and may be a case where a person who is the monitoring target gets on an automobile that is another monitoring target.

Figure 10:
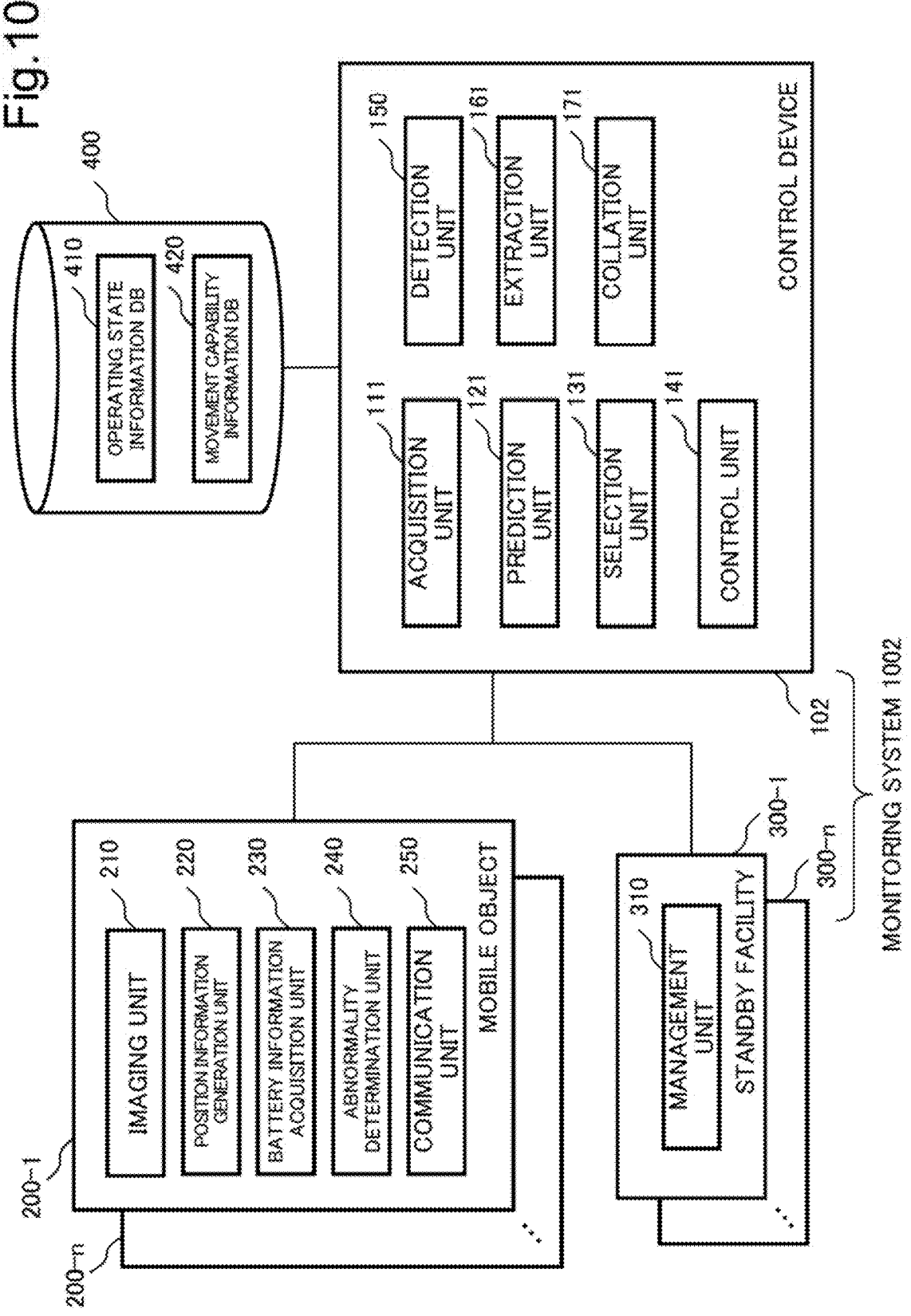
FIG. 10 is a block diagram illustrating an example of a functional configuration of a monitoring system according to a third example embodiment.

FIG. 10 is a block diagram illustrating an example of a configuration of a monitoring system 1002 according to the third example embodiment. As illustrated in FIG. 10, the monitoring system 1002 is similar to the monitoring system 1001 described in the second example embodiment except that the monitoring system 1002 includes a control device 102 instead of the control device 101 in the second example embodiment. That is, the monitoring system 1002 includes the control device 102 and standby facilities 300-1, 300-2, . . . , and 300-n. A description of the configuration and operation of the monitoring system 1002 illustrated in FIG. 10 overlapping with those of the second example embodiment will be omitted.

As illustrated in FIG. 10, the control device 102 includes an acquisition unit 111, a prediction unit 121, a selection unit 131, a control unit 141, a detection unit 150, an extraction unit 161, and a collation unit 171. The extraction unit 161 and the collation unit 171 perform operations described below in addition to the operations of the extraction unit 160 and the collation unit 170 described in the second example embodiment, respectively.

The extraction unit 161 extracts a feature amount of a monitoring target from a video based on imaging data of each of the plurality of monitoring mobile objects. Specifically, in a case where information indicating an abnormal state detected by the detection unit 150 includes information indicating that a distance between a monitoring mobile object and another mobile object has become equal to or less than a predetermined value, the extraction unit 161 extracts a feature amount of a monitoring target from a video based on imaging data of each of the plurality of monitoring mobile objects.

The collation unit 171 collates each of the extracted feature amounts of the monitoring targets. In a case where the collation result indicates that the feature amounts match each other, it can be appreciated that the monitoring targets of the plurality of monitoring mobile objects are the same. At this time, it can be determined that the monitoring targets of the plurality of monitoring mobile objects have joined.

[Operation of Control Device 102]

Next, an operation of the control device 102 according to the third example embodiment will be described with reference to FIGS. 11 and 12.

Figure 11:
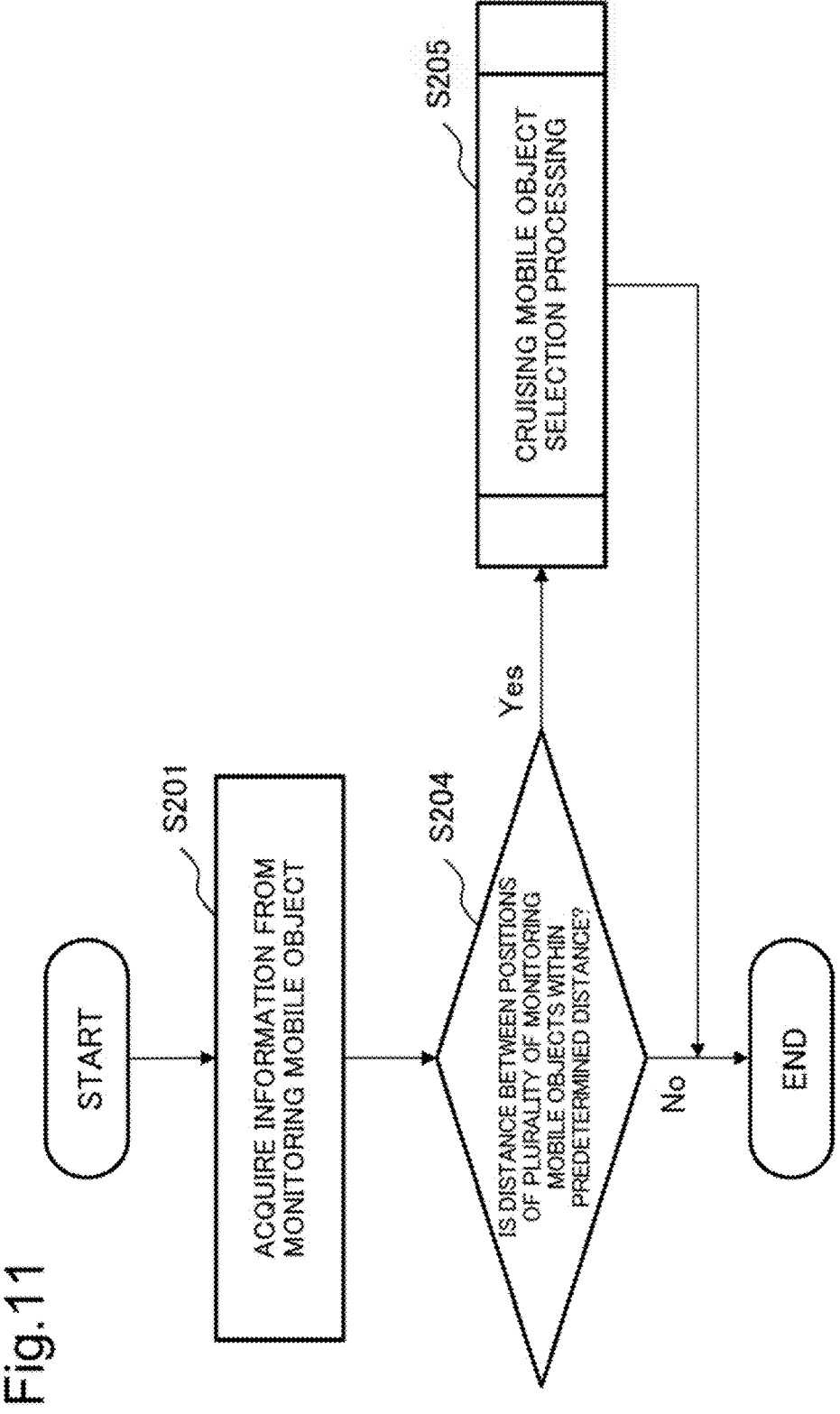
FIG. 11 is a flowchart illustrating an example of an operation of a control device according to the third example embodiment.

FIG. 11 is a flowchart illustrating an example of the operation of the control device 102. The acquisition unit 111 acquires information including imaging data from the monitoring mobile object (S201). This processing is similar to the processing of S201 illustrated in FIG. 7.

In a case where the detection unit 150 has detected, from a plurality of monitoring mobile objects, information indicating an abnormal state, including information indicating that a distance to another mobile object becomes equal to or less than a predetermined value (Yes in S204), the control device 102 performs cruising mobile object selection processing to be described later (S205). In a case where the detection unit 150 has not detected, from the plurality of monitoring mobile objects, the information indicating an abnormal state, including the information indicating that the distance to another mobile object has become equal to or less than the predetermined value, the control device 102 ends the operation. Similarly to the operation illustrated in FIG. 7, the control device 102 repeats the processings of S201, S204, and S205 as long as the monitoring mobile object continues monitoring.

Figure 12:
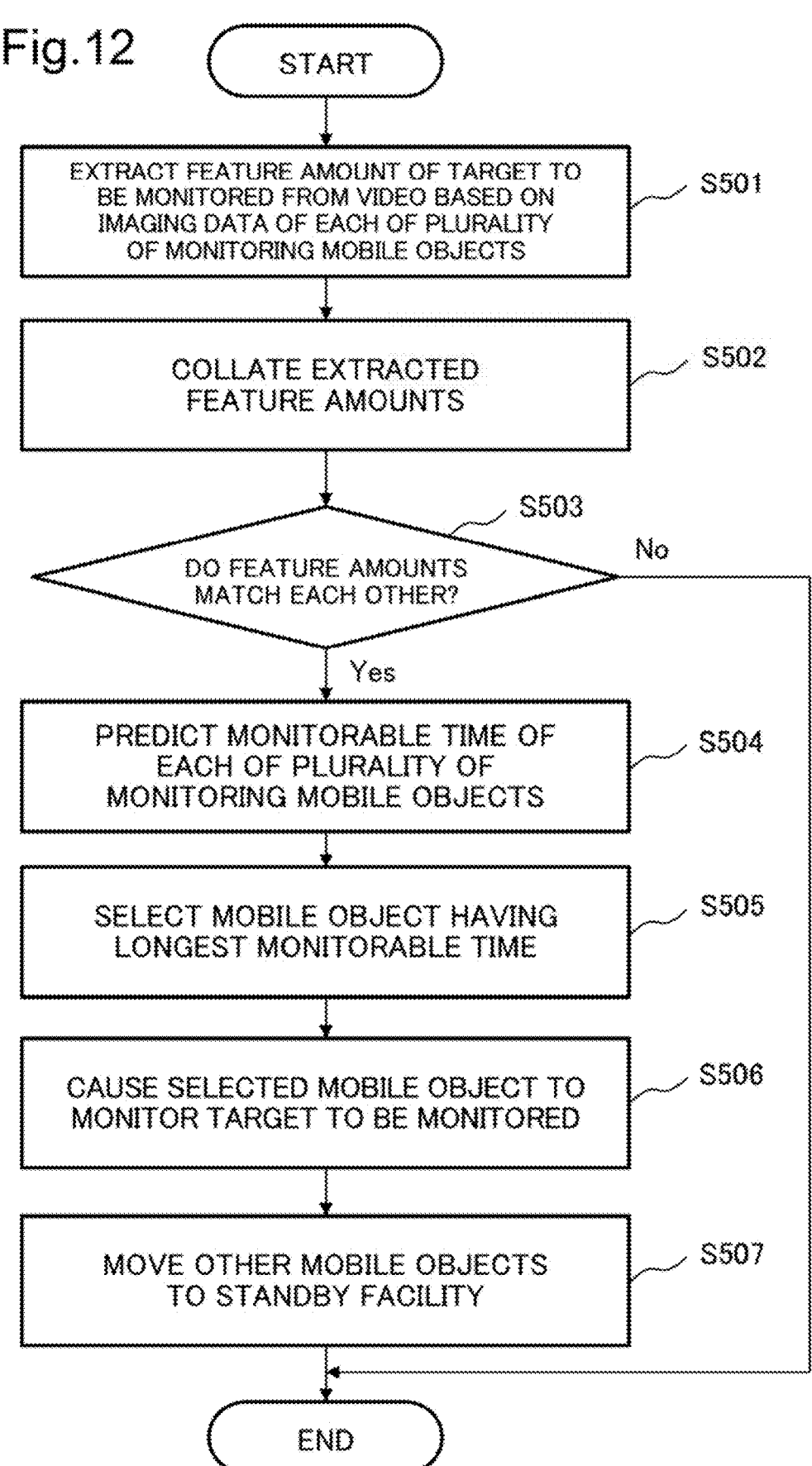
FIG. 12 is a flowchart illustrating an example of cruising mobile object selection processing according to the third example embodiment.

FIG. 12 is a flowchart for describing an example of the cruising mobile object selection processing performed by the control device 102. The extraction unit 161 extracts a feature amount of a monitoring target from a video based on imaging data of each of the plurality of monitoring mobile objects (S501). The collation unit 171 collates the feature amounts extracted by the extraction unit 161 (S502).

In a case where the feature amounts of the monitoring targets do not match each other (No in S503), the cruising mobile object selection processing ends.

In a case where the feature amounts of the monitoring targets match each other (Yes in S503), the prediction unit 121 predicts the monitorable time of each of the plurality of monitoring mobile objects (S504). The selection unit 131 selects a mobile object having the longest monitorable time among the monitoring mobile objects (S505).

The control unit 141 causes the selected mobile object to monitor the monitoring target (S506). The control unit 141 moves a mobile object that is not selected by the selection unit 131 among the plurality of monitoring mobile objects to one of the standby facilities 300 (S507). In the processing of S507, the control device 102 may perform processing of moving the monitoring mobile object to the standby facility illustrated in FIG. 9.

As described above, in a case where each of a plurality of monitoring mobile objects monitors each of a plurality of targets to be monitored, and the plurality of targets to be monitored join, the control device 102 according to the third example embodiment controls one mobile object of the plurality of mobile objects to monitor the targets to be monitored after the joining, and controls another mobile object to move to the standby facility. With this configuration, the control device 102 according to the third example embodiment can charge a mobile object that is no longer necessary for monitoring among a plurality of monitoring mobile objects and can use the mobile object again for monitoring, and thus, an effect that monitoring can be performed more continuously can be obtained.

Modified Example 4

In a case where the monitoring targets join, the control device 102 does not have to perform control to move an unselected mobile object to the standby facility 300 until a predetermined time elapses.

Specifically, in the processing of S503, in a case where the feature amounts of the monitoring targets match each other, the control device 102 does not perform the processings of S504 and subsequent steps until a predetermined time elapses.

As a result, the control device 102 according to Modified Example 4 can continuously monitor, even in a case where monitoring targets after joining are dispersed again within a predetermined time, each of dispersed monitoring targets.

Fourth Example Embodiment

Next, a monitoring system including a control device according to a fourth example embodiment will be described. In the fourth example embodiment, processing in a case where the number of monitoring targets of a mobile object 200 has increased will be described.

Figure 13:
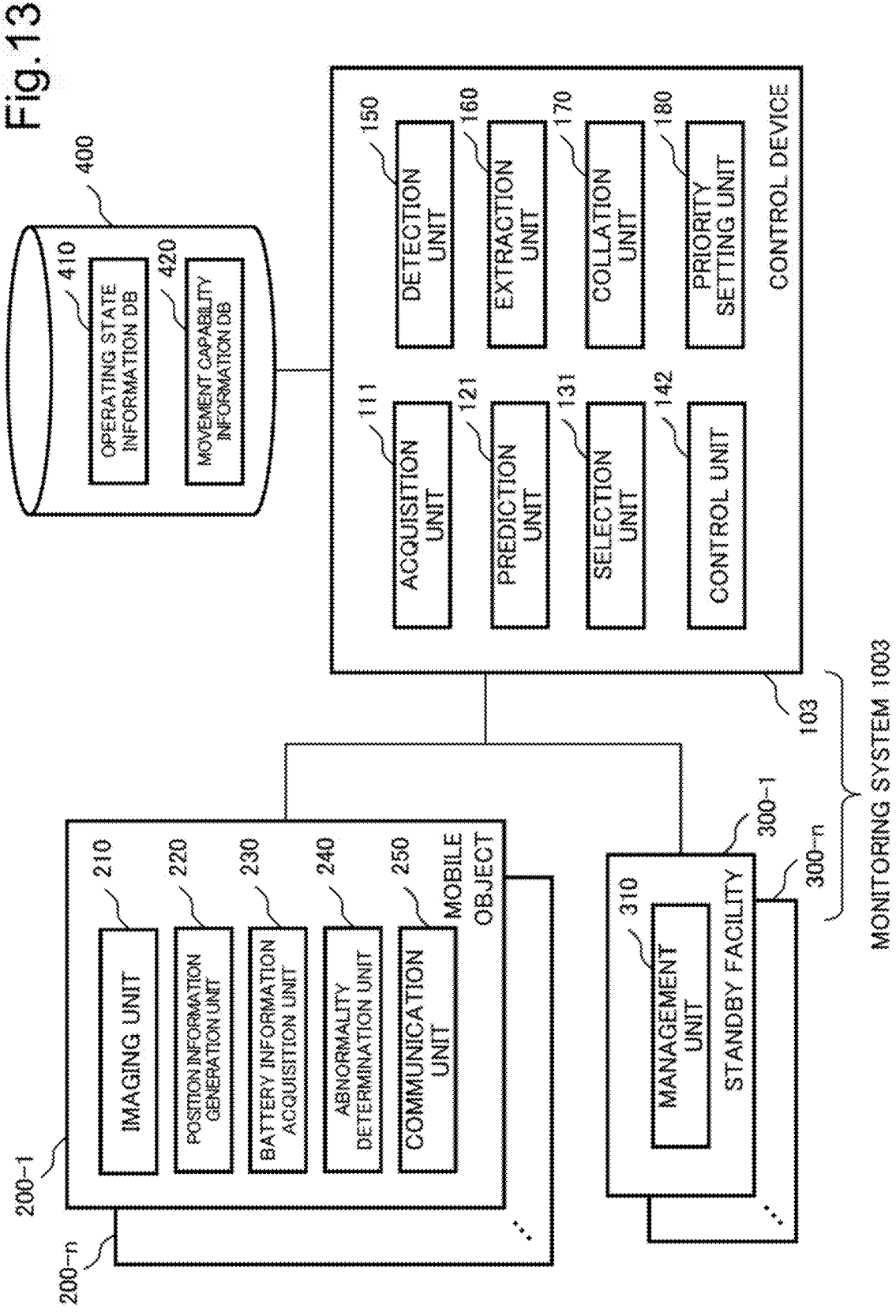
FIG. 13 is a block diagram illustrating an example of a functional configuration of a monitoring system according to a fourth example embodiment.

FIG. 13 is a block diagram illustrating an example of a configuration of a monitoring system 1003 according to the fourth example embodiment. As illustrated in FIG. 13, the monitoring system 1003 is similar to the monitoring system 1001 described in the second example embodiment except that the monitoring system 1003 includes a control device 103 instead of the control device 101 in the second example embodiment. That is, the monitoring system 1003 includes the control device 103 and standby facilities 300-1, 300-2, . . . , and 300-n. A description of the configuration and operation of the monitoring system 1003 illustrated in FIG. 13 overlapping with those of the second example embodiment will be omitted.

When an imaging unit 210 detects that the number of monitoring targets has increased, an abnormality determination unit 240 determines that the mobile object 200 is in an abnormal state. A communication unit 250 transmits, to the control device 103, information indicating an abnormal state, including information indicating that the number of monitoring targets has increased. Examples of a case where the number of monitoring targets has increased include a case where the monitoring target is a crowd, and the crowd is dispersed, or a case where the monitoring target is an automobile, a person gets off the automobile, and the person and the automobile move separately.

As illustrated in FIG. 13, the control device 103 includes an acquisition unit 111, a prediction unit 121, a selection unit 131, a control unit 142, a detection unit 150, an extraction unit 160, a collation unit 170, and a priority setting unit 180. The control unit 142 performs an operation described below in addition to the operation of the control unit 141 described in the second example embodiment.

The priority setting unit 180 sets a monitoring priority for a monitoring target. Specifically, in a case where the detection unit 150 has detected an alarm indicating that the number of monitoring targets has increased, the priority setting unit 180 sets a monitoring priority for each monitoring target. As a priority calculation method, for example, it is conceivable to detect the size of each monitoring target based on imaging data generated by a monitoring mobile object, and set a higher priority in descending order of the detected size of the monitoring target. Specifically, for example, in a case where the number of crowds to be monitored increases from one to two, the priority setting unit 180 sets a higher priority to a larger crowd of the two crowds and sets a lower priority to a smaller crowd. A priority setting method is not limited to this example, and for example, the speed of the monitoring target may be measured from imaging data generated by the monitoring mobile object, and a higher priority may be set in descending order of the speed of the monitoring target. In this manner, the priority setting unit 180 sets the monitoring priority for each target to be monitored. The priority setting unit 180 is an example of a setting means.

The control unit 142 causes the monitoring mobile object to monitor the target to be monitored according to the set priority. Specifically, the control unit 142 controls the monitoring mobile object to monitor a target to be monitored having the highest set priority.

The control device 103 selects mobile objects to perform monitoring for targets to be monitored having the second highest set priority and lower priorities in descending order of priority.

[Operation of Control Device 103]

Next, an operation of the control device 103 according to the fourth example embodiment will be described with reference to FIGS. 14 and 15.

Figure 14:
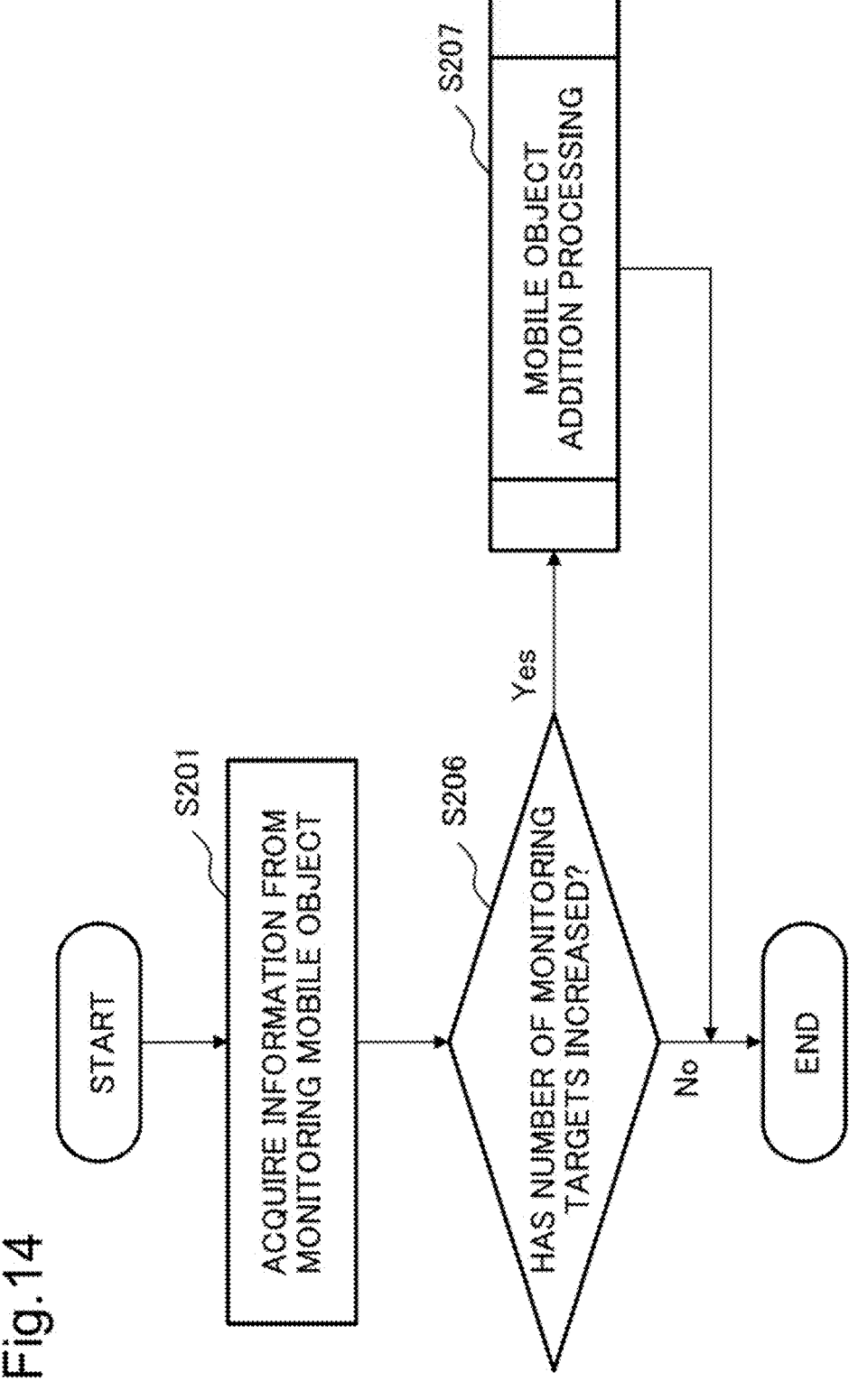
FIG. 14 is a flowchart illustrating an example of an operation of a control device according to the fourth example embodiment.

FIG. 14 is a flowchart illustrating an example of the operation of the control device 103. The acquisition unit 111 acquires information including imaging data from the monitoring mobile object (S201). This processing is similar to the processing of S201 illustrated in FIG. 7.

In a case where the detection unit 150 has detected the information indicating an abnormal state, including the information indicating that the number of monitoring targets has increased (Yes in S206), the control device 103 performs mobile object addition processing to be described later (S207). In a case where the detection unit 150 has not detected the information indicating an abnormal state, including the information indicating that the number of monitoring targets has increased, the control device 103 ends the operation. Similarly to the operation illustrated in FIG. 7, the control device 103 repeats the processings of S201, S206, and S207 as long as the monitoring mobile object continues monitoring.

FIG. 15 is a flowchart for describing an example of the mobile object addition processing performed by the control device 103. The priority setting unit 180 calculates the monitoring priority for each monitoring target based on the imaging data (S601). The control unit 142 causes the monitoring mobile object to monitor a target to be monitored with the highest priority (S602).

The processings of S603 to S606 correspond to the processings of S301 to S304 of the flowchart illustrated in FIG. 8. That is, the control device 103 acquires position information, battery information, and movement capability information of each of a plurality of mobile objects, predicts a monitorable time of each standby mobile object based on the acquired position information, battery information, and movement capability information, and selects a mobile object based on the predicted monitorable time. Therefore, a detailed description of the processings of S603 to S606 will be omitted.

The control unit 142 moves the selected mobile object to a position for monitoring a monitoring target with the next highest priority (S607).

The extraction unit 160 extracts a feature amount of the monitoring target with the next highest priority from the imaging data of the monitoring mobile object (S608).

The processings of S609 to S612 correspond to the processings of S308 to S311 of the flowchart illustrated in FIG. 8. That is, the control device 103 extracts a feature amount of an object from a video based on imaging data of the selected mobile object, and causes the selected mobile object to monitor the monitoring target in a case where a result of collation using the extracted feature amounts indicates that the extracted feature amounts match each other. Therefore, a detailed description of the processings of S608 to S612 will be omitted.

In a case where all the increased targets to be monitored (that is, all the targets to be monitored for which the priority has been set) are monitored by each of the mobile objects 200 (Yes in S613), the control device 103 ends the mobile object addition processing. In a case where not all the increased targets to be monitored are monitored by the mobile objects 200 (No in S613), the control device 103 returns to the processing of S606.

As described above, in a case where there are a plurality of targets to be monitored, the control device 103 according to the fourth example embodiment sets the monitoring priority for each target. In a case where the number of targets to be monitored increases, the control device 103 sets the priority for each target to be monitored, and controls the monitoring mobile object to monitor a monitoring target having the highest priority among the calculated priorities. With this configuration, the control device 103 according to the fourth example embodiment can continue monitoring at least a target to be monitored with a high priority even in a case where the number of targets to be monitored has increased.

For a plurality of targets to be monitored except a target to be monitored that is being monitored by the monitoring mobile object in descending order of the set priority for the targets to be monitored, the control device 103 according to the fourth example embodiment predicts the monitorable times of a plurality of standby mobile objects, selects at least one mobile object from among the plurality of standby mobile objects, and moves the selected mobile object to a position for monitoring the target to be monitored. With this configuration, the control device 103 according to the fourth example embodiment can add a mobile object to perform monitoring in a case where the number of targets to be monitored has increased, and thus can appropriately continuously perform monitoring.

Fifth Example Embodiment

A fifth example embodiment will be described with reference to FIG. 16.

Figure 16:
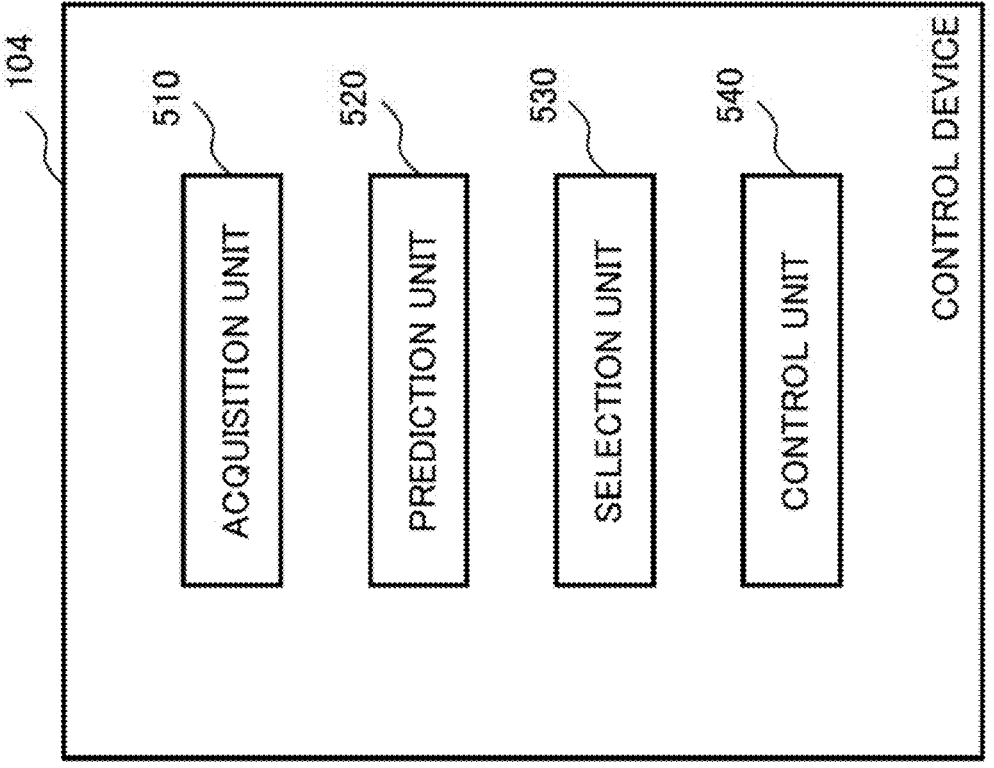
FIG. 16 is a block diagram illustrating an example of a functional configuration of a control device according to a fifth example embodiment.

FIG. 16 is a block diagram illustrating a configuration of a control device 104 according to the fifth example embodiment. As illustrated in FIG. 16, the control device 104 includes an acquisition unit 510, a prediction unit 520, a selection unit 530, and a control unit 540.

The acquisition unit 510 acquires position information, battery information, and movement capability information of each of a plurality of mobile objects.

The prediction unit 520 predicts a monitorable time, which is a time for which each standby mobile object can monitor a target to be monitored, based on the position information of a monitoring mobile object, which is a mobile object that is monitoring the target to be monitored, among the plurality of mobile objects, the position information of the standby mobile object, which is a mobile object that is on standby, among the plurality of mobile objects, and the battery information and the movement capability information of each of the plurality of mobile objects.

The selection unit 530 selects at least one mobile object from a plurality of standby mobile objects based on the monitorable time.

The control unit 540 performs control to move the selected mobile object to a position for monitoring the target to be monitored.

With this configuration, even in a case where monitoring is performed using a plurality of types of mobile objects having different capabilities, the control device 104 according to the fifth example embodiment can cause a mobile object having a long monitorable time to take over the monitoring. Therefore, for example, since the control device 104 does not need to frequently switch a video showing the target to be monitored, it is possible to reduce the possibility that a user viewing the video has difficulty in grasping the state of the target to be monitored. Therefore, the control device 104 according to the fifth example embodiment can obtain an effect that a target to be monitored can be appropriately monitored even in a case where a plurality of mobile objects used for monitoring are a plurality of types of mobile objects having different capabilities.

<Example of Hardware Configuration of Control Device>

Figure 17:
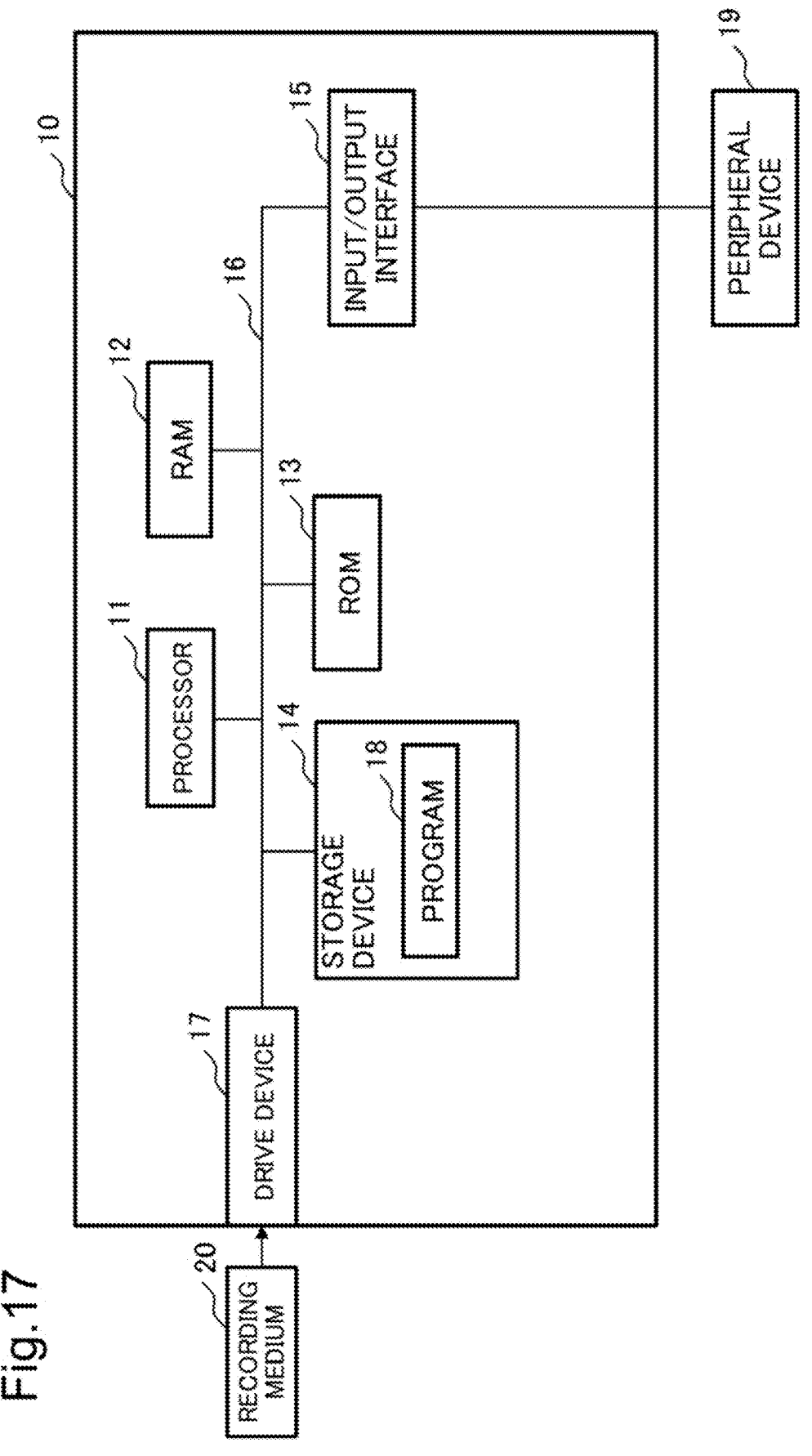
FIG. 17 is a block diagram illustrating an example of a hardware configuration of a computer device that implements the control devices according to the first to fifth example embodiments.

Hardware implementing the control devices of the first to fifth example embodiments will be described. FIG. 17 is a block diagram illustrating an example of a hardware configuration of a computer device that implements the control device in each example embodiment. Each block illustrated in FIG. 17 can be implemented by a combination of a computer device 10 that implements the control device and an control method in each example embodiment and software.

As illustrated in FIG. 17, the computer device 10 includes a processor 11, a random access memory (RAM) 12, a read only memory (ROM) 13, a storage device 14, an input/ output interface 15, a bus 16, and a drive device 17. The control device may be implemented by a plurality of electric circuits.

The storage device 14 stores a program (computer program) 18. The processor 11 executes the program 18 of the control device by using the RAM 12. Specifically, for example, the program 18 includes a program that causes a computer to perform the processing illustrated in FIGS. 3, 7, 8, 9, 11, 12, 14, and 15. The processor 11 executes the program 18 to implement the functions of the components (for example, the acquisition units 110, 111, and 510, the prediction units 120, 121, and 520, the selection units 130, 131, and 530, the control units 140, 141, 142, and 540 described above) of the control device. The program 18 may be stored in the ROM 13. The program 18 may be recorded in a recording medium 20 and read using the drive device 17, or may be transmitted from an external device (not illustrated) to the computer device 10 via a network (not illustrated).

The input/output interface 15 exchanges data with a peripheral device (a keyboard, a mouse, a display device, or the like) 19. The input/output interface 15 functions as a means that acquires or outputs data. The bus 16 connects the components.

There are various modified examples of the method of implementing the control device. For example, the control device can be implemented as a dedicated device. Alternatively, the control device can be implemented based on a combination of a plurality of devices.

A processing method in which a program for implementing each component in the function of each example embodiment is recorded in a recording medium, the program recorded in the recording medium is read as a code, and a computer is caused to execute the program also falls within the scope of each example embodiment. That is, a computer-readable recording medium also falls within the scope of each example embodiment. The above-described recording medium in which the program is recorded and the program itself are also included in each example embodiment.

The recording medium is, for example, a floppy (registered trademark) disk, a hard disk, an optical disk, a magneto-optical disk, a compact disc (CD)-ROM, a magnetic tape, a nonvolatile memory card, or a ROM, but is not limited thereto. The program recorded in the recording medium is not limited to a program that performs processing alone, and a program that is operated on an operating system (OS) to perform processing in cooperation with other software and functions of an extension board also falls within the scope of each example embodiment.

While the invention has been particularly shown and described with reference to example embodiments thereof, the invention is not limited to these example embodiments. It will be understood by those of ordinary skill in the art that various changes in form and details may be made therein without departing from the spirit and scope of the invention as defined by the claims.

Some or all of the above-described example embodiments can also be described as the following Supplementary Notes, but are not limited thereto.

<Supplementary Note>

[Supplementary Note 1]

A control device including:

an acquisition unit that acquires position information, battery information, and movement capability information of each of a plurality of mobile objects;

a prediction unit that predicts a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object;

a selection unit that selects, based on the monitorable time, at least one mobile object of a plurality of the standby mobile objects; and a control unit that controls the selected mobile object to move to a position for monitoring the target to be monitored.

[Supplementary Note 2]

The control device according to Supplementary Note 1, in which the selection unit selects a mobile object having the longest monitorable time among the standby mobile objects.

[Supplementary Note 3]

The control device according to Supplementary Note 2, in which in a case where there are a plurality of mobile objects having the longest monitorable time, the selection unit selects a mobile object that takes the shortest time to move to a position of the monitoring mobile object among the standby mobile objects

[Supplementary Note 4]

The control device according to any one of Supplementary Notes 1 to 3, further including a priority setting unit that sets a monitoring priority for each target in a case where there are a plurality of targets to be monitored, in which in a case where the number of targets to be monitored has increased, the priority setting unit sets the priority for each of the targets to be monitored, and the control unit controls the monitoring mobile object to monitor a target to be monitored having the highest set priority among the set priority.

[Supplementary Note 5]

The control device according to Supplementary Note 4, in which, for the plurality of targets to be monitored except a target to be monitored that is being monitored by the monitoring mobile object in descending order of the set priority for the targets to be monitored, the prediction unit predicts the monitorable times of the plurality of standby mobile objects, the selection unit selects at least one mobile object of the plurality of standby mobile objects, and the control unit moves the selected mobile object to the position for monitoring the target to be monitored.

[Supplementary Note 6]

The control device according to any one of Supplementary Notes 1 to 5, in which in a case where each of a plurality of the monitoring mobile objects monitors each of a plurality of the targets to be monitored, and the plurality of targets to be monitored join, the control unit controls one mobile object of the plurality of mobile objects to monitor the targets to be monitored after the joining, and controls another mobile object to move to a standby facility in which the mobile body stands by.

[Supplementary Note 7]

The control device according to any one of Supplementary Notes 1 to 6, in which the plurality of mobile objects each include an imaging unit that generates imaging data by imaging, and a communication unit that transmits the imaging data, the control device further includes:

an extraction unit that extracts a feature amount of an object included in a video based on imaging data transmitted from the selected mobile object and a feature amount of the target to be monitored included in a video based on imaging data transmitted from the monitoring mobile object; and a collation unit that collates the feature amount of the object with the feature amount of the target to be monitored, and the control unit controls the selected mobile object to monitor the target to be monitored in a case where the feature amount of the object and the feature amount of the target to be monitored match each other.

[Supplementary Note 8]

The control device according to any one of Supplementary Notes 1 to 7, in which the acquisition unit acquires information indicating availability of the standby facility in which the mobile object stands by, and the control unit that moves the monitoring mobile object to an available standby facility located closest to the position of the monitoring mobile object based on the information indicating the availability of the standby facility.

[Supplementary Note 9]

The control device according to Supplementary Note 8, in which the prediction unit predicts a cruising distance of the monitoring mobile object based on the battery information of the monitoring mobile object and the movement capability information of the monitoring mobile object, and in a case where the cruising distance is insufficient for a distance from the position of the monitoring mobile object to the standby facility to which the monitoring mobile object is to be moved, the control unit moves a mobile object that is on standby in the standby facility located closest to the monitoring mobile object to another available standby facility, and moves the monitoring mobile object to the standby facility located closest to the monitoring mobile object.

[Supplementary Note 10]

The control device according to any one of Supplementary Notes 1 to 9, in which in a case where no target to be monitored is detected by the monitoring mobile object, the control unit causes the monitoring mobile object to monitor a predetermined range including a position at which no target to be monitored is detected, and moves the monitoring mobile object to the standby facility in which the mobile object stands by in a case where the monitoring mobile object did not detected the target to be monitored within a predetermined time.

[Supplementary Note 11]

The control device according to any one of Supplementary Notes 1 to 10, in which the acquisition unit acquires information on a category of the target to be monitored, and the selection unit selects a mobile object movable at a speed corresponding to the category of the target to be monitored from among the standby mobile objects whose monitorable time is equal to or longer than a predetermined value.

[Supplementary Note 12]

A monitoring system including:

a standby facility including a management unit that manages a standby mobile object that is on standby in the standby facility; and the control device according to any one of Supplementary Notes 1 to 11, in which the management unit transmits, to the control device, the position information of the standby mobile object that is on standby in the standby facility and the battery information of the standby mobile object that is on standby in the standby facility.

[Supplementary Note 13]

The monitoring system according to Supplementary Note 12, in which the management unit acquires the position information of the monitoring mobile object and the battery information of the monitoring mobile object from the monitoring mobile object, and transmits the acquired position information of the monitoring mobile object and the acquired battery information of the monitoring mobile object to the control unit.

[Supplementary Note 14]

A control method including:

acquiring position information, battery information, and movement capability information of each of a plurality of mobile objects;

predicting a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object;

selecting, based on the monitorable time, at least one mobile object of a plurality of the standby mobile objects; and controlling the selected mobile object to move to a position for monitoring the target to be monitored.

[Supplementary Note 15]

The control method according to Supplementary Note 14, further including selecting a mobile object having the longest monitorable time among the standby mobile objects.

[Supplementary Note 16]

The control method according to Supplementary Note 15, further including, in a case where there is a plurality of mobile objects having the longest monitorable time, selecting a mobile object that takes the shortest time to move to a position of the monitoring mobile object among the standby mobile objects.

[Supplementary Note 17]

The control method according to any one of Supplementary Notes 14 to 16, further including, in a case where the number of targets to be monitored has increased, setting a monitoring priority for each target to be monitored, and controlling the monitoring mobile object to monitor a target to be monitored having the highest set priority among the set priority.

[Supplementary Note 18]

The control method according to Supplementary Note 17, further including, for a plurality of targets to be monitored except a target to be monitored that is being monitored by the monitoring mobile object in descending order of the set priority for the targets to be monitored, predicting the monitorable times of the plurality of standby mobile objects, selecting at least one mobile object of the plurality of standby mobile objects, and moving the selected mobile object to the position for monitoring the target to be monitored.

[Supplementary Note 19]

The control method according to any one of Supplementary Notes 14 to 18, further including, in a case where each of a plurality of the monitoring mobile objects monitors each of a plurality of the targets to be monitored, and the plurality of targets to be monitored join, controlling one mobile object of the plurality of mobile objects to monitor the targets to be monitored after the joining, and controlling another mobile object to move to a standby facility in which the mobile body stands by.

[Supplementary Note 20]

The control method according to any one of Supplementary Notes 14 to 19, in which the plurality of mobile objects each include an imaging unit that generates imaging data by imaging, and a communication unit that transmits the imaging data, and the control method further includes:

extracting a feature amount of an object included in a video based on imaging data transmitted from the selected mobile object and a feature amount of the target to be monitored included in a video based on imaging data transmitted from the monitoring mobile object;

collating the feature amount of the object with the feature amount of the target to be monitored; and controlling the selected mobile object to monitor the target to be monitored in a case where the feature amount of the object and the feature amount of the target to be monitored match each other.

[Supplementary Note 21]

The control method according to any one of Supplementary Notes 14 to 20, further including:

acquiring information indicating availability of the standby facility in which the mobile object stands by; and moving the monitoring mobile object to an available standby facility located closest to the position of the monitoring mobile object based on the information indicating the availability of the standby facility.

[Supplementary Note 22]

The control method according to Supplementary Note 21, further including:

predicting a cruising distance of the monitoring mobile object based on the battery information of the monitoring mobile object and the movement capability information of the monitoring mobile object; and in a case where the cruising distance is insufficient for a distance from the position of the monitoring mobile object to the standby facility to which the monitoring mobile object is to be moved, moving a mobile object that is on standby in the standby facility located closest to the monitoring mobile object to another available standby facility, and moving the monitoring mobile object to the standby facility located closest to the monitoring mobile object.

[Supplementary Note 23]

The control method according to any one of Supplementary Notes 14 to 22, further including, in a case where no target to be monitored is detected by the monitoring mobile object, causing the monitoring mobile object to monitor a predetermined range including a position at which no target to be monitored is detected, and moving the monitoring mobile object to the standby facility in which the mobile object stands by in a case where the monitoring mobile object did not detected the target to be monitored within a predetermined time.

[Supplementary Note 24]

The control method according to any one of Supplementary Notes 14 to 23, further including:

acquiring information on a category of the target to be monitored; and selecting a mobile object movable at a speed corresponding to the category of the target to be monitored from among the standby mobile objects whose monitorable time is equal to or longer than a predetermined value.

[Supplementary Note 25]

A computer-readable recording medium storing a program causing a computer to perform:

processing of acquiring position information, battery information, and movement capability information of each of a plurality of mobile objects;

processing of predicting a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object;

processing of selecting, based on the monitorable time, at least one mobile object of a plurality of the standby mobile objects; and processing of controlling the selected mobile object to move to a position for monitoring the target to be monitored.

[Supplementary Note 26]

The computer-readable recording medium according to Supplementary Note 25, further causing a computer to perform, in the selecting processing, selecting a mobile object having the longest monitorable time among the standby mobile objects.

[Supplementary Note 27]

The computer-readable recording medium according to Supplementary Note 26, further causing a computer to perform, in a case where there are a plurality of mobile objects having the longest monitorable time, in the selecting processing, selecting a standby mobile object that takes the shortest time to move to a position of the monitoring mobile object among the standby mobile objects.

[Supplementary Note 28]

The computer-readable recording medium according to any one of Supplementary Notes 25 to 27, further causing a computer to perform processing of setting a monitoring priority for each target in a case where there are a plurality of targets to be monitored, and in a case where the number of targets to be monitored has increased, in the priority setting processing, setting the priority for each of the targets to be monitored, and in the controlling processing, controlling the monitoring mobile object to monitor a target to be monitored having the highest set priority among the set priority.

[Supplementary Note 29]

The computer-readable recording medium according to Supplementary Note 28, further causing the computer to perform processing of, for the plurality of targets to be monitored except a target to be monitored that is being monitored by the monitoring mobile object in descending order of the set priority for the targets to be monitored, predicting the monitorable times of the plurality of standby mobile objects in the predicting processing, selecting at least one mobile object of the plurality of standby mobile objects in the selecting processing, and moving the selected mobile object to the position for monitoring the target to be monitored in the controlling processing.

[Supplementary Note 30]

The computer-readable recording medium according to any one of Supplementary Notes 25 to 29, further causing the computer to perform processing of, in a case where each of a plurality of the monitoring mobile objects monitors each of a plurality of the targets to be monitored, and the plurality of targets to be monitored join, in the controlling processing, controlling one mobile object of the plurality of mobile objects to monitor the targets to be monitored after the joining, and controlling another mobile object to move to a standby facility in which the mobile body stands by.

[Supplementary Note 31]

The computer-readable recording medium according to any one of Supplementary Notes 25 to 30, in which the plurality of mobile objects each include an imaging unit that generates imaging data by imaging, and a communication unit that transmits the imaging data, the computer-readable recording medium further causes a computer to perform processing of extracting a feature amount of an object included in a video based on imaging data transmitted from the selected mobile object and a feature amount of the target to be monitored included in a video based on imaging data transmitted from the monitoring mobile object, and processing of collating the feature amount of the object with the feature amount of the target to be monitored, and in the controlling processing, controlling the selected mobile object to monitor the target to be monitored in a case where the feature amount of the object and the feature amount of the target to be monitored match each other.

[Supplementary Note 32]

The computer-readable recording medium according to any one of Supplementary Notes 25 to 31, further causing the computer to perform processing of, in the acquiring processing, acquiring information indicating availability of the standby facility in which the mobile object stands by, and in the controlling processing, moving the monitoring mobile object to an available standby facility located closest to the position of the monitoring mobile object based on the information indicating the availability of the standby facility.

[Supplementary Note 33]

The computer-readable recording medium according to Supplementary Note 32, further causing the computer to perform processing of, in the predicting processing, predicting a cruising distance of the monitoring mobile object based on the battery information of the monitoring mobile object and the movement capability information of the monitoring mobile object, and in a case where the cruising distance is insufficient for a distance from the position of the monitoring mobile object to the standby facility to which the monitoring mobile object is to be moved, in the controlling processing, moving a mobile object that is on standby in the standby facility located closest to the monitoring mobile object to another available standby facility, and the monitoring mobile object is moved to the standby facility located closest to the monitoring mobile object.

[Supplementary Note 34]

The computer-readable recording medium according to any one of Supplementary Notes 25 to 33, further causing the computer to perform processing of, in a case where no target to be monitored is detected by the monitoring mobile object, in the controlling processing, causing the monitoring mobile object to monitor a predetermined range including a position at which no target to be monitored is detected, and moving the monitoring mobile object to the standby facility in which the mobile object stands by in a case where the monitoring mobile object did not detected the target to be monitored within a predetermined time.

[Supplementary Note 35]

The computer-readable recording medium according to any one of Supplementary Notes 25 to 34, further causing the computer to perform processing of, in the acquiring processing, acquiring information on a category of the target to be monitored, and in the selecting processing, selecting a mobile object movable at a speed corresponding to the category of the target to be monitored from among the standby mobile objects whose monitorable time is equal to or longer than a predetermined value.

REFERENCE SIGNS LIST 100, 101, 102, 103, 104 control device
110, 111, 510 acquisition unit
120, 121, 520 prediction unit
130, 131, 530 selection unit
140, 141, 142 control unit
150 detection unit
160, 161 extraction unit 33
34

170, 171 collation unit
180 priority setting unit
200 mobile object
300 standby device
400 storage device

What is claimed is:

1. A control device comprising:
a memory; and
at least one processor performing operations to:
acquire position information, battery information, and movement capability information of each of a plurality of mobile objects;
predict a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object;
select, based on the monitorable time, at least one mobile object of a plurality of the standby mobile objects; and
control the selected mobile object to move to a position for monitoring the target to be monitored,
wherein, in a state in which each monitoring mobile object of the plurality of mobile objects monitors each of a plurality of targets to be monitored and the plurality of targets to be monitored gather together, the at least one processor performs operations to control one monitoring mobile object of the plurality of mobile objects to monitor the plurality of targets to be monitored after the plurality of targets gather together, and control another monitoring mobile object of the plurality of mobile objects to move to a standby facility in which the another monitoring mobile objects stands by,
wherein the at least one processor further performs operation to:
set a monitoring priority for each target in a case where there are a plurality of targets to be monitored,
in a case where the number of targets to be monitored has increased,
set the priority for each of the targets to be monitored, and
control the monitoring mobile object to monitor a target to be monitored having a highest set priority among the set priority, and
wherein, the at least one processor further performs operation to:
for the plurality of targets to be monitored except a target to be monitored that is being monitored by the monitoring mobile object in descending order of the set priority for the targets to be monitored,
predict the monitorable times of the plurality of standby mobile objects,
select at least one mobile object of the plurality of standby mobile objects, and
move the selected mobile object to the position for monitoring the target to be monitored.

2. The control device according to claim 1, wherein the at least one processor further performs operation to:
select a mobile object having a longest monitorable time among the standby mobile objects.

3. The control device according to claim 2, wherein the at least one processor further performs operation to:
in a case where there are a plurality of mobile objects having the longest monitorable time,
select a mobile object that takes a shortest time to move to a position of the monitoring mobile object among the standby mobile objects.

4. The control device according to claim 1, wherein the plurality of mobile objects for
generating imaging data by imaging, and
transmitting the imaging data,
the at least one processor further performs operation to:
extract a feature amount of an object included in a video based on imaging data transmitted from the selected mobile object and a feature amount of the target to be monitored included in a video based on imaging data transmitted from the monitoring mobile object; and
collate the feature amount of the object with the feature amount of the target to be monitored, and
control the selected mobile object to monitor the target to be monitored in a case where the feature amount of the object and the feature amount of the target to be monitored match each other.

5. The control device according to claim 1, wherein the at least one processor further performs operation to:
acquire information indicating availability of the standby facility in which the mobile object stands by, and
move the monitoring mobile object to an available standby facility located closest to the position of the monitoring mobile object based on the information indicating the availability of the standby facility.

6. The control device according to claim 5, wherein the at least one processor further performs operation to:
predict a cruising distance of the monitoring mobile object based on the battery information of the monitoring mobile object and the movement capability information of the monitoring mobile object, and
in a case where the cruising distance is insufficient for a distance from the position of the monitoring mobile object to the standby facility to which the monitoring mobile object is to be moved,
move a mobile object that is on standby in the standby facility located closest to the monitoring mobile object to another available standby facility, and move the monitoring mobile object to the standby facility located closest to the monitoring mobile object.

7. The control device according to claim 1, wherein the at least one processor further performs operation to:
in a case where no target to be monitored is detected by the monitoring mobile object,
cause the monitoring mobile object to monitor a predetermined range including a position at which no target to be monitored is detected, and move the monitoring mobile object to the standby facility in which the mobile object stands by in a case where the monitoring mobile object did not detected the target to be monitored within a predetermined time.

8. The control device according to claim 1, wherein the at least one processor further performs operation to:
acquire information on a category of the target to be monitored, and
select a mobile object movable at a speed corresponding to the category of the target to be monitored from among the standby mobile objects whose monitorable time is equal to or longer than a predetermined value.

9. A control method comprising:

acquiring position information, battery information, and movement capability information of each of a plurality of mobile objects;

predicting a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object;

selecting, based on the monitorable time, at least one mobile object of a plurality of the standby mobile objects; and controlling the selected mobile object to move to a position for monitoring the target to be monitored wherein, in a state in which each monitoring mobile object of the plurality of mobile objects monitors each of a plurality of targets to be monitored and the plurality of targets to be monitored gather together, controlling one monitoring mobile object of the plurality of mobile objects to monitor the plurality of targets to be monitored after the plurality of targets gather together, and control another monitoring mobile object of the plurality of mobile objects to move to a standby facility in which the another monitoring mobile objects stands by, the control method further comprising, in a case where the number of targets to be monitored has increased, setting a monitoring priority for each target to be monitored, and controlling the monitoring mobile object to monitor a target to be monitored having a highest set priority among the set priority, and the control method further comprising, for a plurality of targets to be monitored except a target to be monitored that is being monitored by the monitoring mobile object in descending order of the set priority for the targets to be monitored, predicting the monitorable times of the plurality of standby mobile objects, selecting at least one mobile object of the plurality of standby mobile objects, and moving the selected mobile object to the position for monitoring the target to be monitored.

10. The control method according to claim 9, further comprising selecting a mobile object having a longest monitorable time among the standby mobile objects.

11. The control method according to claim 10, further comprising, in a case where there is a plurality of mobile objects having the longest monitorable time selecting a mobile object that takes a shortest time to move to a position of the monitoring mobile object among the standby mobile objects.

12. A non-transitory computer-readable recording medium storing a program causing a computer to perform:

acquiring position information, battery information, and movement capability information of each of a plurality of mobile objects;

predicting a monitorable time based on the position information of a monitoring mobile object, the position information of a standby mobile object, and the battery information and the movement capability information of each of the plurality of mobile objects, the monitoring mobile object being a mobile object monitoring a target to be monitored among the plurality of mobile objects, the standby mobile object being a mobile object being on standby among the plurality of mobile objects, the monitorable time being a time for which the target to be monitored is monitorable by each standby mobile object;

selecting, based on the monitorable time, at least one mobile object of a plurality of the standby mobile objects; and controlling the selected mobile object to move to a position for monitoring the target to be monitored, wherein, in a state in which each monitoring mobile object of the plurality of mobile objects monitors each of a plurality of targets to be monitored and the plurality of targets to be monitored gather together, controlling one monitoring mobile object of the plurality of mobile objects to monitor the plurality of targets to be monitored after the plurality of targets gather together, and control another monitoring mobile object of the plurality of mobile objects to move to a standby facility in which the another monitoring mobile objects stands by, and the program further causing a computer to perform:

setting a monitoring priority for each target in a case where there are a plurality of targets to be monitored, and in a case where the number of targets to be monitored has increased, setting the priority for each of the targets to be monitored, and controlling the monitoring mobile object to monitor a target to be monitored having a highest set priority among the set priority, and the program further causing the computer to perform:

for a plurality of targets to be monitored except a target to be monitored that is being monitored by the monitoring mobile object in descending order of the set priority for the targets to be monitored, predicting the monitorable times of the plurality of standby mobile objects, selecting at least one mobile object of the plurality of standby mobile objects, and moving the selected mobile object to the position for monitoring the target to be monitored.

13. The non-transitory computer-readable recording medium according to claim 12, further causing a computer to perform, selecting a mobile object having a longest monitorable time among the standby mobile objects.

14. The non-transitory computer-readable recording medium according to claim 13, further causing a computer to perform, in a case where there are a plurality of mobile objects having the longest monitorable time, selecting a mobile object that takes a shortest time to move to a position of the monitoring mobile object among the standby mobile objects.

15. The non-transitory computer-readable recording medium according to claim 12, further causing a computer to perform processing of setting a monitoring priority for each target in a case where there are a plurality of targets to be monitored, and in a case where the number of targets to be monitored has increased, setting the priority for each of the targets to be monitored, and controlling the monitoring mobile object to monitor a target to be monitored having a highest set priority among the set priority.

* * * * *